US011869169B2

(12) United States Patent
Le et al.

(10) Patent No.: US 11,869,169 B2
(45) Date of Patent: Jan. 9, 2024

(54) ADAPTIVE SUB-PIXEL SPATIAL TEMPORAL INTERPOLATION FOR COLOR FILTER ARRAY

(71) Applicant: Samsung Electronics Co., Ltd., Suwon-si (KR)

(72) Inventors: Nguyen Thang Long Le, Richardson, TX (US); Tyler Luu, Richardson, TX (US); John William Glotzbach, Allen, TX (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 17/665,054

(22) Filed: Feb. 4, 2022

(65) Prior Publication Data

US 2023/0047764 A1 Feb. 16, 2023

Related U.S. Application Data

(60) Provisional application No. 63/231,571, filed on Aug. 10, 2021.

(51) Int. Cl.
*G06T 3/40* (2006.01)
*G06T 7/20* (2017.01)
*G06T 11/00* (2006.01)

(52) U.S. Cl.
CPC .............. *G06T 3/4015* (2013.01); *G06T 7/20* (2013.01); *G06T 11/001* (2013.01); *G06T 2207/10024* (2013.01)

(58) Field of Classification Search
None
See application file for complete search history.

(56) References Cited

U.S. PATENT DOCUMENTS 7,106,913 B2 * 9/2006 Castorina ............... G06T 5/50
382/284
7,515,747 B2 * 4/2009 Okutomi ............ H04N 25/134
382/167

(Continued)

FOREIGN PATENT DOCUMENTS

CN 107578392 B 1/2018
CN 111539893 A 8/2020

(Continued)

OTHER PUBLICATIONS

Wronski, et al., "Handheld Multi-Frame Super-Resolution", ACM Trans. Graph., vol. 38, No. 4, Article 28, Jul. 2019, 24 pgs.

(Continued)

*Primary Examiner* — Anand P Bhatnagar

(57) ABSTRACT

The present disclosure describes devices and methods for generating RGB images from Bayer filter images using adaptive sub-pixel spatiotemporal interpolation. An electronic device includes a processor configured to estimate green values at red and blue pixel locations of an input Bayer frame based on green values at green pixel locations of the input Bayer frame and a kernel for green pixels, generate a green channel of a joint demosaiced-warped output RGB pixel from the input Bayer frame based on the green values at the green pixel locations, the kernel for green pixels, and an alignment vector map, and generate red and blue channels of the joint demosaiced-warped output RGB pixel from the input Bayer frame based on the estimated green values at the red and blue pixel locations, kernels for red and blue pixels, and the alignment vector map.

20 Claims, 17 Drawing Sheets

(56) References Cited

U.S. PATENT DOCUMENTS

| | | | |
|---|---|---|---|
| 8,666,196 B2* | 3/2014 | Young | G06T 3/4015 |
| | | | 382/280 |
| 9,332,239 B2* | 5/2016 | Cote | G06T 3/4015 |
| 9,426,381 B1* | 8/2016 | Kwok | H04N 7/52 |
| 9,438,809 B2 | 9/2016 | Sheikh et al. | |
| 9,584,721 B2 | 2/2017 | Campbell et al. | |
| 9,710,896 B2* | 7/2017 | Lim | G06T 5/002 |
| 9,990,695 B2* | 6/2018 | Nishimura | G06T 11/001 |
| 10,911,691 B1 | 2/2021 | Le et al. | |
| 10,922,957 B2 | 2/2021 | Rhoads et al. | |
| 11,107,191 B2 | 8/2021 | Elgendy et al. | |
| 2006/0072814 A1* | 4/2006 | Messina | G06T 3/4015 |
| | | | 348/222.1 |
| 2009/0160965 A1* | 6/2009 | Sorek | H01L 27/14621 |
| | | | 348/222.1 |
| 2020/0151854 A1* | 5/2020 | Ferrés | G06T 5/50 |
| 2021/0006755 A1 | 1/2021 | Kim et al. | |
| 2021/0377497 A1* | 12/2021 | Bernstein | G06T 3/4007 |

FOREIGN PATENT DOCUMENTS

| | | |
|---|---|---|
| JP | 2014-200008 A | 10/2014 |
| KR | 10-2119138 B1 | 6/2020 |
| WO | 01/52183 A1 | 7/2001 |

OTHER PUBLICATIONS

Ehret et al., "Joint Demosaicking and Denoising by Fine-Tuning of Bursts of Raw Images", Sep. 2019, 10 pages.

International Search Report and Written Opinion of the International Searching Authority dated Sep. 7, 2022 in connection with International Patent Application No. PCT/KR2022/007825, 8 pages.

* cited by examiner

ADAPTIVE SUB-PIXEL SPATIAL TEMPORAL INTERPOLATION FOR COLOR FILTER ARRAY

CROSS-REFERENCE TO RELATED APPLICATION(S) AND CLAIM OF PRIORITY

This application claims priority under 35 U.S.C. § 119(e) to U.S. Provisional Patent Application No. 63/231,571 filed on Aug. 10, 2021. The above-identified provisional patent application is hereby incorporated by reference in its entirety.

TECHNICAL FIELD

This disclosure relates generally to image processing. More specifically, this disclosure relates to a method and system for improving performance of a multi-frame image processing pipeline.

BACKGROUND

Digital camera image sensors are typically comprised of a grid of photosensors (referred to as pixels) overlaid with a grid of corresponding single-color filters in a color space such as red-green-blue (RGB) or cyan-magenta-yellow (CMY) such that each pixel receives light of a single color in the color space. The grid of filters, referred to as a color filter mosaic (CFM) or color filter array (CFA), is designed to have a repeating pattern of single-color filters such that a group of pixels in one repetition of the pattern contains each color in the color space. The raw output of such an image sensor thus contains only a single color in each pixel. In order to create an output image in which each pixel contains information from the full color space, data from multiple surrounding pixels is used to interpolate the missing colors at each pixel using an image processing function known as demosaicing.

SUMMARY

This disclosure provides a system and method for generating RGB images from Bayer filter images using adaptive sub-pixel spatiotemporal interpolation.

In a first embodiment, an electronic device includes a processor configured to estimate green values at red and blue pixel locations of an input Bayer frame based on green values at green pixel locations of the input Bayer frame and a kernel for green pixels, generate a green channel of a joint demosaiced-warped output RGB pixel from the input Bayer frame based on the green values at the green pixel locations, the kernel for green pixels, and an alignment vector map, and generate red and blue channels of the joint demosaiced-warped output RGB pixel from the input Bayer frame based on the estimated green values at the red and blue pixel locations, kernels for red and blue pixels, and the alignment vector map.

In a second embodiment, an electronic device includes a processor configured to generate a prototype kernel for each possible combination of a pixel color and a coherence, a strength, and an orientation of an image edge, and divide the prototype kernel into a plurality of polyphase kernels. The processor is further configured to, for each polyphase kernel having a fractional weight phase, determine a regularized polyphase kernel having a regularized primary axis and a regularized secondary axis, normalize coefficients of the regularized polyphase kernels to generate a dictionary of adaptive kernels, and select adaptive kernels for red, green, and blue pixels from the dictionary of adaptive kernels for generation of a joint demosaic-warped output RBG pixel from an input Bayer frame, based on a coherence, a strength, and an orientation of the input Bayer frame at the output RGB pixel.

In a third embodiment, a method includes estimating green values at red and blue pixel locations of an input Bayer frame based on green values at green pixel locations of the input Bayer frame and a kernel for green pixels, generating a green channel of a joint demosaiced-warped output RGB pixel from the input Bayer frame based on the green values at the green pixel locations, the kernel for green pixels, and an alignment vector map, and generating red and blue channels of the joint demosaiced-warped output RGB pixel from the input Bayer frame based on the estimated green values at the red and blue pixel locations, kernels for red and blue pixels, and the alignment vector map.

The method further includes generating a prototype kernel for each possible combination of a pixel color and a coherence, a strength, and an orientation of an image edge, dividing the prototype kernel into a plurality of polyphase kernels. The method also includes determining, for each polyphase kernel having a fractional weight phase, a regularized polyphase kernel having a regularized primary axis and a regularized secondary axis, normalizing coefficients of the regularized polyphase kernels to generate a dictionary of adaptive kernels, and selecting the kernels for red, green, and blue pixels from the dictionary of adaptive kernels based on a coherence, a strength, and an orientation of the input Bayer frame at the output RGB pixel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 16B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
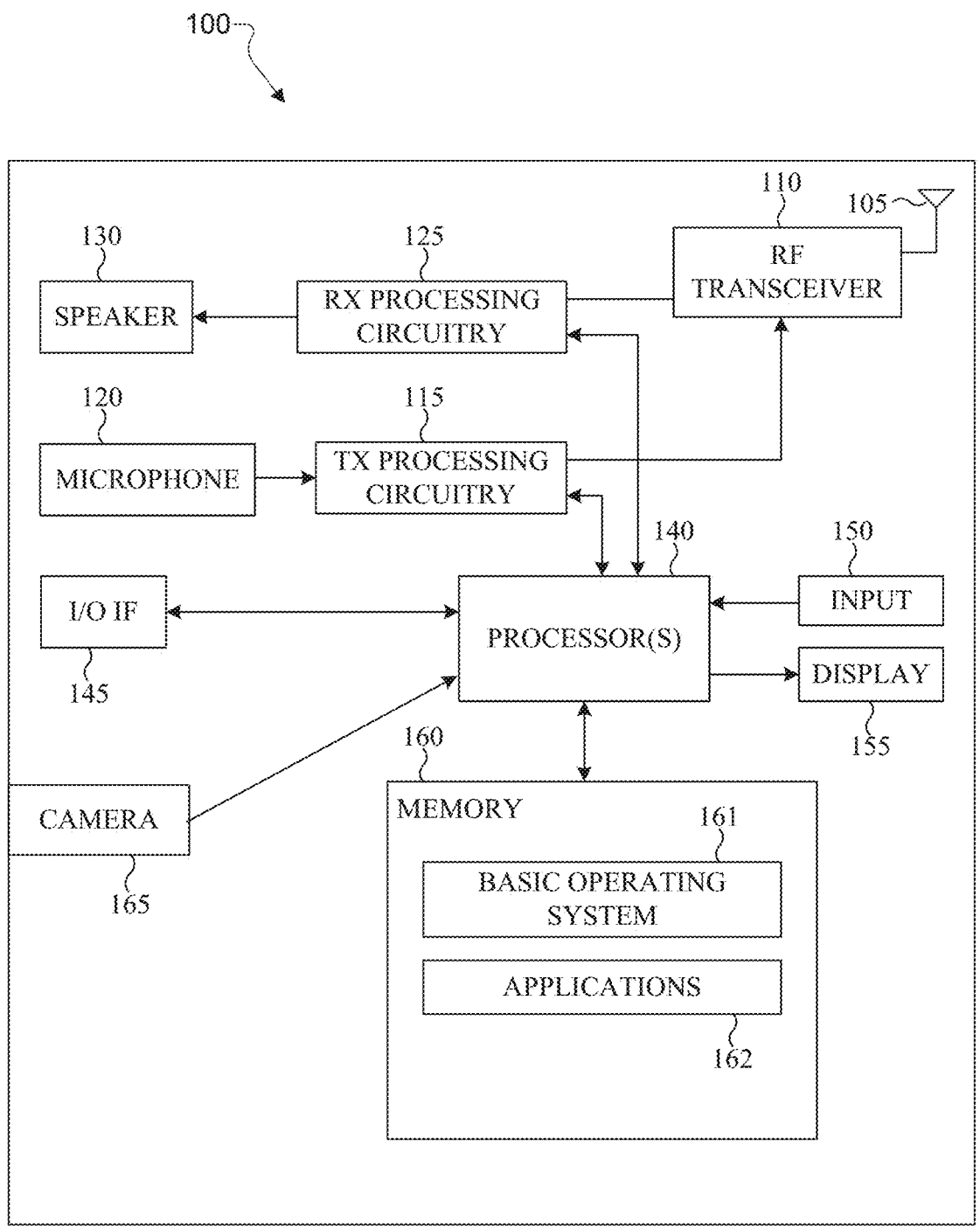
FIG. 1 illustrates an example electronic device according to embodiments of this disclosure.

FIG. 1 illustrates an example electronic device 100 according to embodiments of this disclosure. The electronic device 100 could be, for example, a mobile phone with a camera. The embodiment of the electronic device 100 shown in FIG. 1 is for illustration only and other embodiments could be used without departing from the scope of this disclosure. The electronic device 100 can come in a wide variety of configurations, and FIG. 1 does not limit the scope of this disclosure to any particular implementation of an electronic device.

As shown in FIG. 1, the electronic device 100 includes an antenna 105, a communication unit 110, a transmit (TX) processing circuitry 115, a microphone 120, and a receive (RX) processing circuitry 125. The communication unit 110 can include, for example, a RF transceiver, a BLUETOOTH transceiver, a WI-FI transceiver, ZIGBEE, infrared, and the like. The electronic device 100 also includes a speaker 130, a processor 140, an input/output (I/O) interface 145, an input 150, a display 155, a memory 160, one or more cameras 165, and a biometric scanner 170. The memory 160 includes an operating system (OS) 161 and applications 162.

The communication unit 110 receives, from the antenna 105, an incoming RF signal transmitted such as a BLUETOOTH or WI-FI signal from an access point (such as a base station, Wi-Fi router, Bluetooth device) of a network (such as a Wi-Fi, Bluetooth, cellular, 5G, LTE, LTE-A, WiMAX, or any other type of wireless network). The communication unit 110 can down-convert the incoming RF signal to generate an intermediate frequency or baseband signal. The intermediate frequency or baseband signal is sent to the RX processing circuitry 125 that generates a processed baseband signal by filtering, decoding, or digitizing the baseband or intermediate frequency signal, or a combination thereof. The RX processing circuitry 125 transmits the processed baseband signal to the speaker 130 (such as for voice data) or to the processor 140 for further processing (such as for web browsing data and remittance).

The TX processing circuitry 115 receives analog or digital voice data from the microphone 120 or other outgoing baseband data from the processor 140. The outgoing baseband data can include web data, e-mail, or interactive video game data. The TX processing circuitry 115 encodes, multiplexes, digitizes, or a combination thereof, the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 105.

The processor 140 can include one or more processors or other processing devices and execute the OS 161 stored in the memory 160 in order to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 is also capable of executing other applications 162 resident in the memory 160. For example, the processor 140 can execute applications 162 that perform image processing and computer vision on images or video received via camera 165. In particular, the processor 140 can execute applications 162 that convert raw CFA images (such as Bayer filter images) into RGB images for display on display 155.

The processor 140 can include any suitable number(s) and type(s) of processors or other devices in any suitable arrangement. For example, in some embodiments, the processor 140 includes at least one microprocessor or microcontroller. Example types of processor 140 include microprocessors, microcontrollers, digital signal processors, field programmable gate arrays, application specific integrated circuits, and discrete circuitry. The processor 140 is also coupled to the I/O interface 145 that provides the electronic device 100 with the ability to connect to other devices. The I/O interface 145 is the communication path between these accessories and the processor 140.

The processor 140 is also coupled to the input 150 and the display 155. The operator of the electronic device 100 can use the input 150 to enter data or inputs into the electronic device 100. Input 150 can be a keyboard, touch screen, mouse, track ball, voice input, or other device capable of acting as a user interface to allow a user in interact with electronic device 100. For example, the input 150 can include voice recognition processing thereby allowing a user to input a voice command via microphone 120. For another example, the input 150 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 150 can be associated with a camera 165 by providing additional input to processor 140. The camera 165 can be used to capture images to be processed by the electronic device 100 or passed on to a server 104 on the network. The input 150 can also include a control circuit. In the capacitive scheme, the input 150 can recognize touch or proximity.

The display 155 can be a liquid crystal display (LCD), light-emitting diode (LED) display, optical LED (OLED), active matrix OLED (AMOLED), or other display capable of rendering text and/or graphics, such as from websites, videos, games, images, and the like. The display 155 can also be a projector. For example, a miniature projector can be used as the display 155 to project an image onto a transparent lens of an HMD for AR applications.

The memory 160 is coupled to the processor 140. Part of the memory 160 could include a random access memory (RAM), and another part of the memory 160 could include a Flash memory or other read-only memory (ROM). The memory 160 can include persistent storage (not shown) that represents any structure(s) capable of storing and facilitating retrieval of information (such as data, program code, and/or other suitable information on a temporary or permanent basis). The memory 160 can contain one or more components or devices supporting longer-term storage of data, such as a ready only memory, hard drive, Flash memory, or optical disc.

Electronic device 100 further includes one or more cameras 165 that can capture images of the physical environment surrounding the electronic device 100. In some embodiments, the camera 165 captures raw images using an image sensor equipped with a CFA. In some embodiments, the CFA is a Bayer filter, which is described further below. The camera 165 can be a still photography camera or a video camera.

Although FIG. 1 illustrates an example of an electronic device configured to perform image processing, various changes can be made to FIG. 1. For example, various components in FIG. 1 could be combined, further subdivided, or omitted, and additional components could be added according to particular needs. As a particular example, the processor 140 could be divided into multiple processors, such as one or more central processing units (CPUs) and one or more graphics processing units (GPUs). As another example, the wireless communication components (e.g., the communication unit 110, TX processing circuitry 115, and RX processing circuitry 125) could be omitted. In addition, as with computing and communication networks, electronic devices can come in a wide variety of configurations, and FIG. 1 does not limit this disclosure to any particular electronic device.

Figure 2:
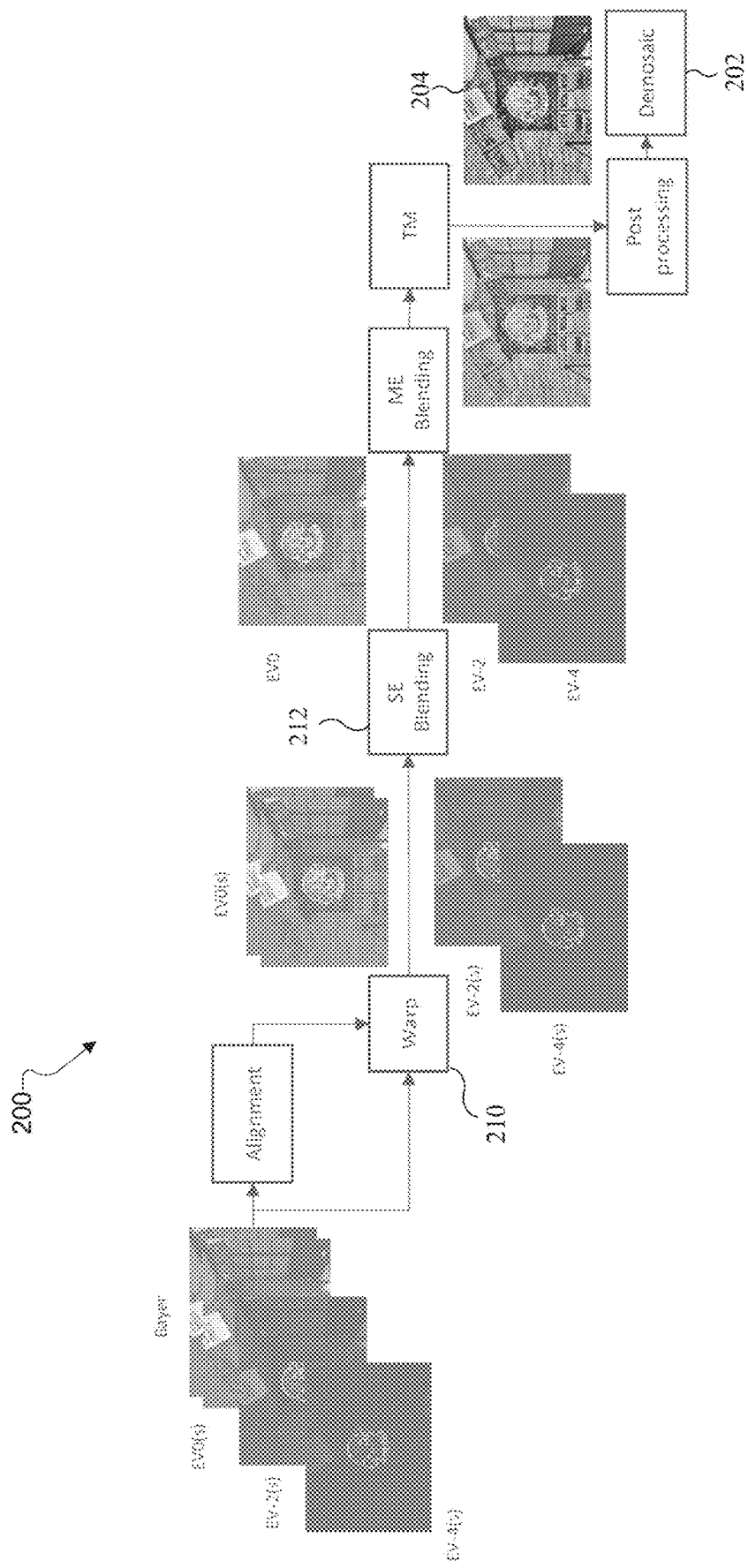
FIGS. 2 and 3 illustrate example multi-frame image processing pipelines.
Figure 3:
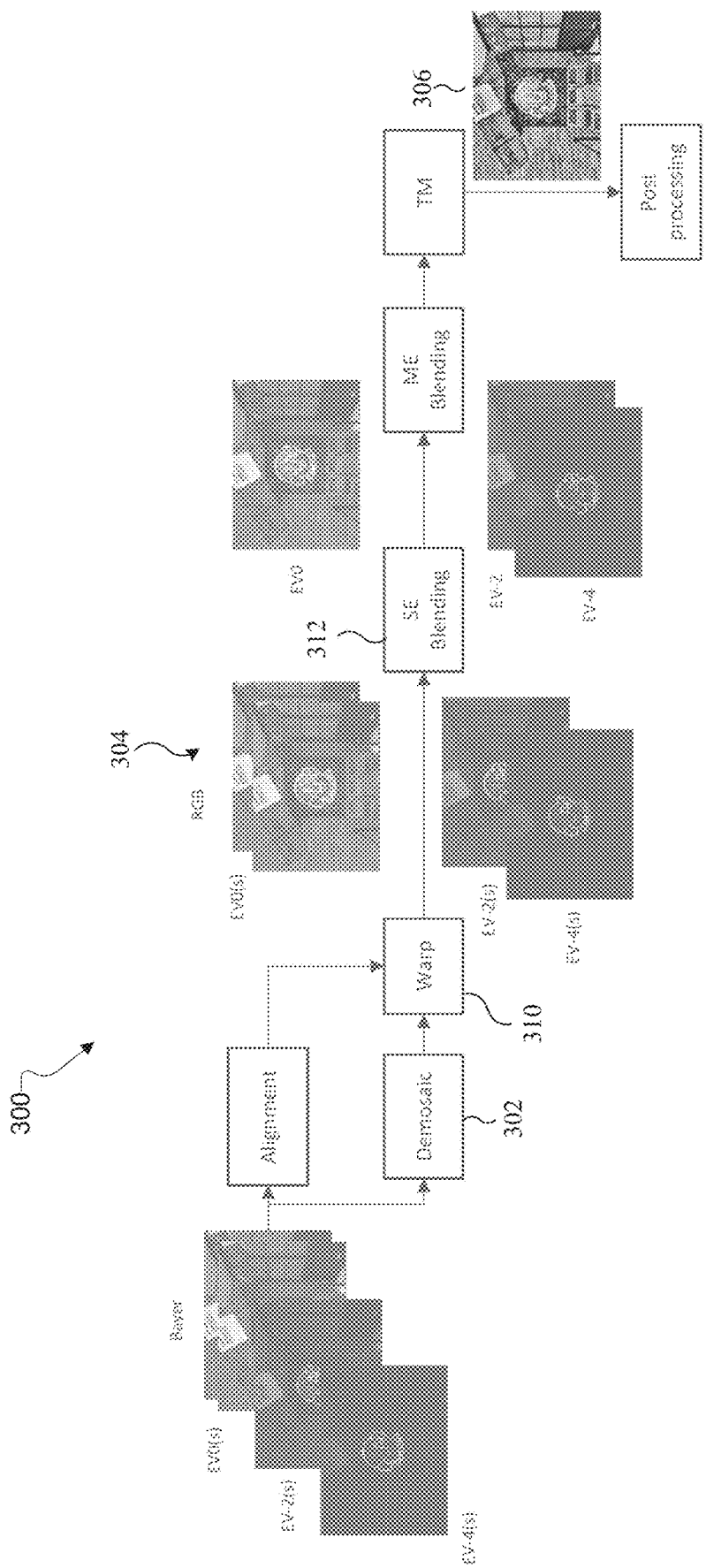

Embodiments of this disclosure contemplate a CFA or CFM design referred to as the Bayer filter, which uses a repeating 2×2 pattern comprised of one red, one blue, and two green pixels. Standard multi-frame image processing pipelines for Bayer filter images often involve multiple components with intermediate images. For example, FIGS. 2 and 3 illustrate example multi-frame image processing pipelines 200 and 300, respectively. In both cases, multiple Bayer frames EVO(s), EV-2(s), and EV-4(s) are input to the image processing pipeline, and an RGB frame is output from the pipeline.

In pipeline 200, blending of the multiple input frames is performed on the Bayer filter images before demosaicing 202 is performed to generate an RBG output image 204. In pipeline 300, demosaicing 302 is performed on the multiple Bayer input frames to convert them to multiple RBG frames 304 before blending of the multiple RBG frames 304 to generate an RBG output image 306. In both pipelines 200 and 300, the processes of warping (210 and 310) and single-exposure (SE) blending (212 and 312) are components that generate intermediate images on the way to the generation of the output RBG image.

Multi-frame image processing pipelines such as example pipelines 200 and 300 are bottlenecked by the performance of the worst performing component in the pipeline. This results in various types of artifacts in the RGB output images generated from Bayer filter input images using these multi-frame image processing pipelines. Accordingly, embodiments of the present disclosure provide an adaptive sub-pixel spatiotemporal interpolation process for a color filter array that that achieves the net effect of the demosaic (e.g., 202 or 302), warp (e.g., 210 or 310), and SE blending (e.g., 212 or 312) processes, as shown in FIG. 4.

Figure 4:
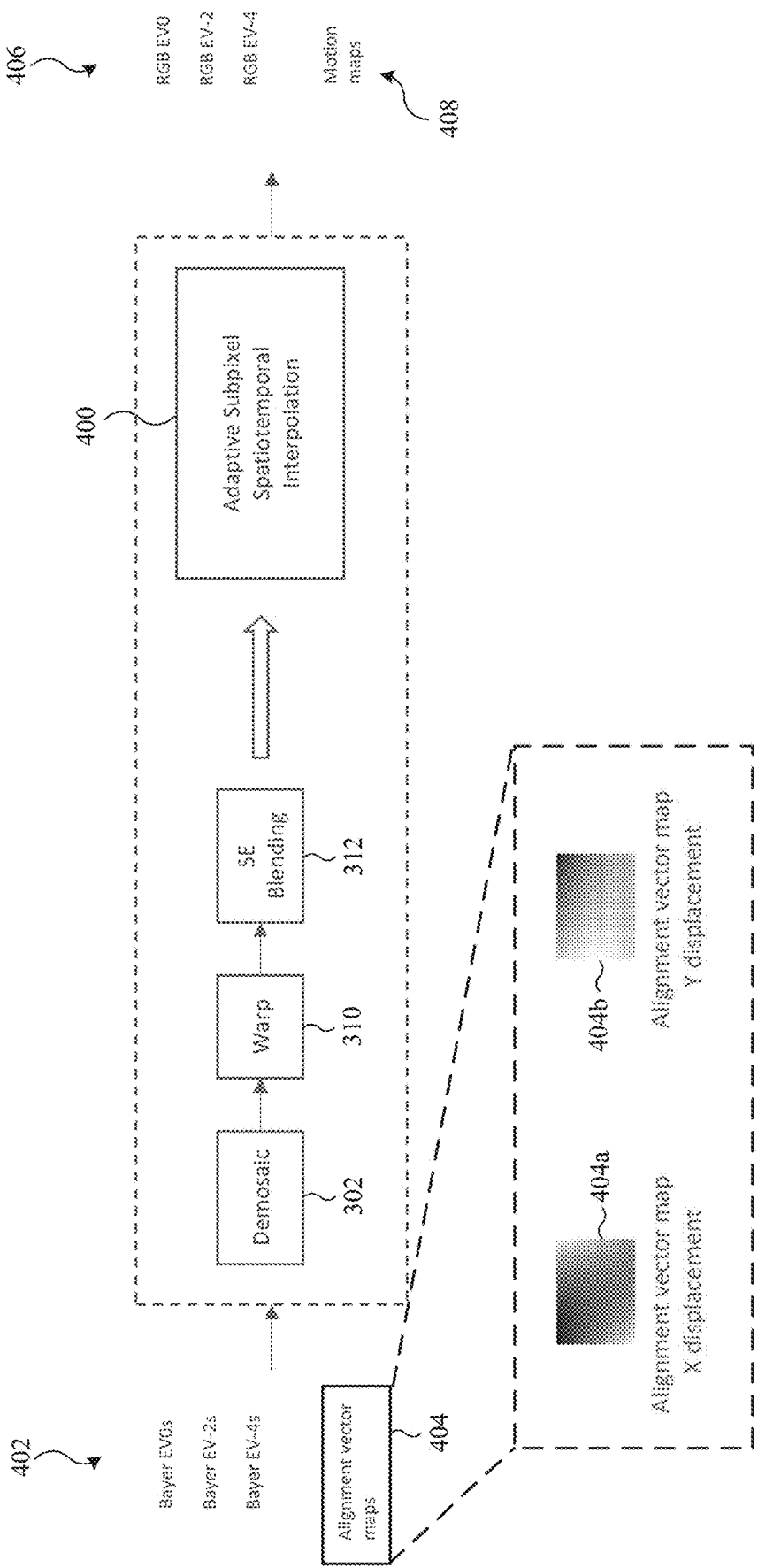
FIG. 4 illustrates an example of the adaptive sub-pixel spatiotemporal interpolation process according to various embodiments of the present disclosure.

FIG. 4 illustrates an example of the adaptive sub-pixel spatiotemporal interpolation process 400 according to various embodiments of the present disclosure. The adaptive sub-pixel spatiotemporal interpolation process 400 is adaptive to both image content and motion. Inputs to the adaptive sub-pixel spatiotemporal interpolation process 400 include multiple multi-exposure (unregistered) CFA/Bayer frames 402 and alignment vector maps 404. Example alignment vector maps 404a and 404b are illustrated, but other alignment vector maps could be generated for different input frames. Outputs of the adaptive sub-pixel spatiotemporal interpolation process 400 include blended (aligned) multi-exposure RGB frames 406 and motion maps 408.

Figure 5:
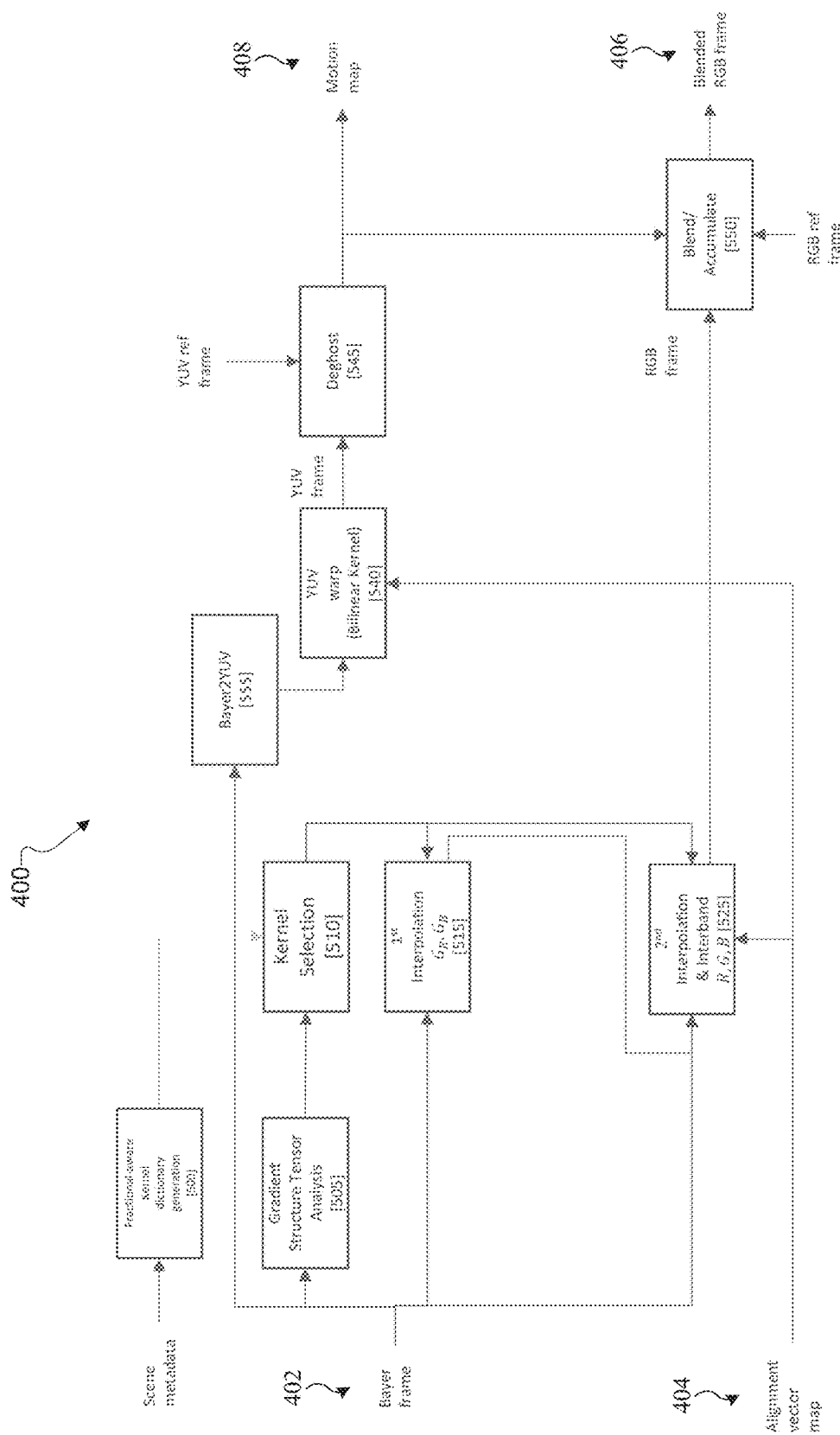
FIG. 5 illustrates the example adaptive sub-pixel spatiotemporal interpolation process in further detail, according to various embodiments of the present disclosure.

FIG. 5 illustrates the example adaptive sub-pixel spatiotemporal interpolation process 400 in further detail, according to various embodiments of the present disclosure. The process of FIG. 5 may be performed by a device such as the electronic device 100, which may be a mobile phone including an integrated camera 165 that acquires Bayer filter images. More specifically, the process of FIG. 5 may be performed by a processor 140 of the electronic device 100, which could include a dedicated image processor. It is understood that any suitable device could perform the process of FIG. 5.

As shown in FIG. 5, the adaptive sub-pixel spatiotemporal interpolation process 400 includes a fractional-aware kernel dictionary generation process 500, a gradient structure tensor analysis process 505, a kernel selection process 510, a first interpolation process 515, a second interpolation process 525, Bayer to YUV process 555, a YUV warp process 540, a deghosting process 545, and a blend/accumulate process 550.

Figure 6:
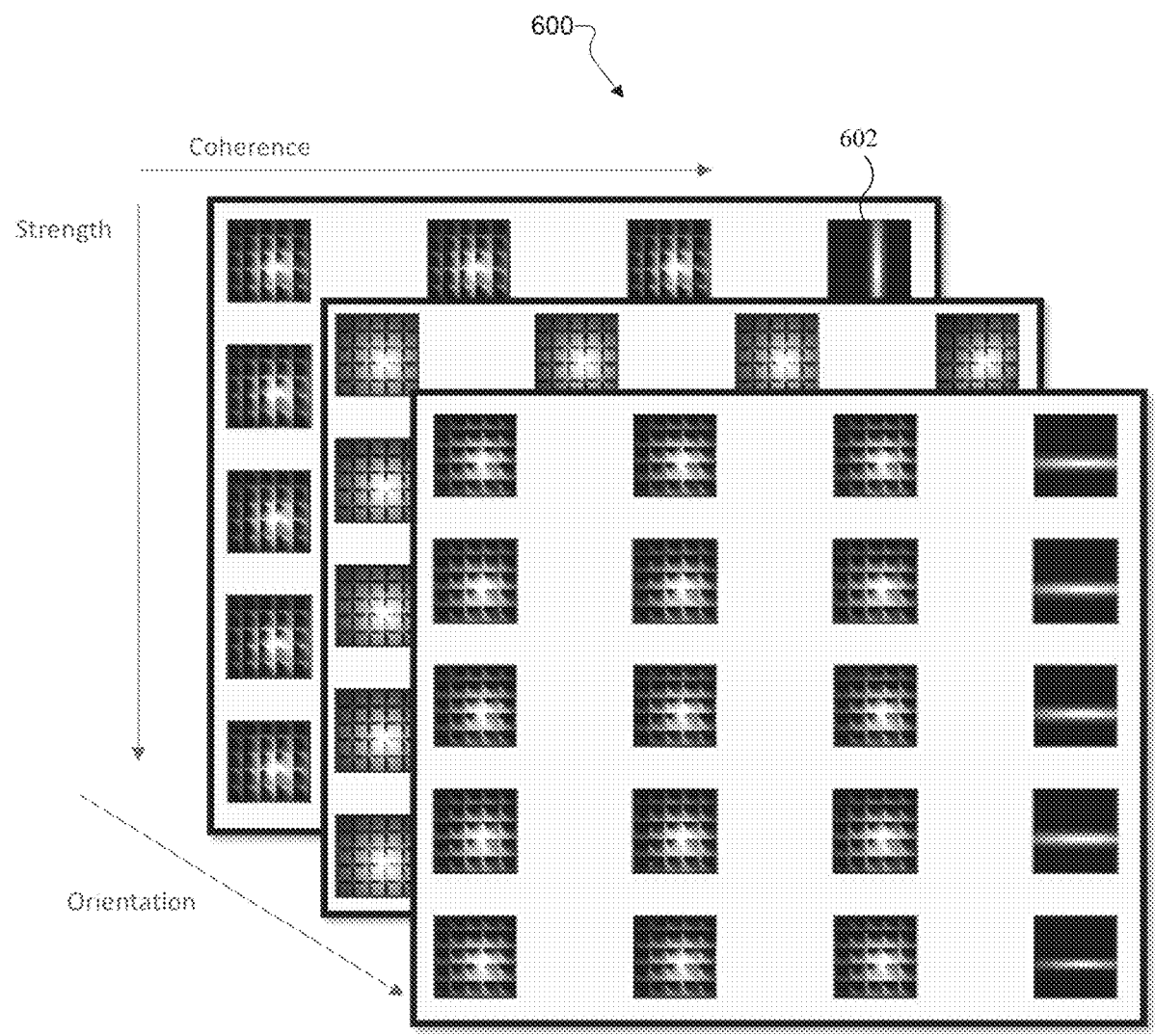
FIG. 6 illustrates an example kernel dictionary for one pixel type (e.g., red, green, or blue), according to various embodiments of the present disclosure.

The fractional-aware kernel dictionary generation process 500 generates a dictionary of multiple multi-frame adaptive demosaic-warp kernels with fractional regularization. An example kernel dictionary 600 for one pixel type (e.g., red, green, or blue) is illustrated in FIG. 6. The process 500 will be described in further detail below with respect to FIGS. 7-11.

The gradient structure tensor analysis process 505 computes a structure tensor as a matrix-valued function of each input Bayer frame 402, defined by:

$$G = \begin{bmatrix} G_{xx} & G_{xy} \\ G_{xy} & G_{yy} \end{bmatrix} \quad (1)$$

where the components of the structure tensor G are $G_{xx}=E[I_x^2]$, $G_{yy}=E[I_y^2]$, and $G_{xy}=E[I_xI_y]$. $E[\cdot]$ here denotes mathematical expectation, which is approximated by averaging over a local window. $I_x$, $I_y$ are gradient images with respect to x and y—i.e., partial derivatives of an image I with respect to x and y, respectively, where x and y represent the two dimensions of the image. The gradient structure tensor is computed directly on the Bayer image (i.e., Bayer frame 402) at full resolution to extract fine image structure.

The kernel selection process 510 selects appropriate kernels from the fractional-aware kernel dictionary (generated by process 500) for demosaic-warp interpolation (in the first interpolation process 515 and second interpolation process 525) of pixels based on the pixel type (e.g., red, green, or blue, and phases) and measures of coherence, strength, and orientation at the pixel, determined based on the gradient structure tensor generated at process 505. This has the effect of adapting the kernel used for interpolation to the image content (e.g., image features such as edges, corners, or flat areas) of the Bayer frame 402 for which the gradient structure tensor was computed in process 505.

More specifically, the kernel selection process 510 can include determination of the eigenvalues of the gradient structure tensor as:

$$\lambda_{1,2} = \frac{1}{2}[G_{xx}+G_{yy}\pm\sqrt{(G_{xx}-G_{yy})^2+4G_{xy}^2}] \quad (2)$$

where $\lambda_1$ is the dominant eigenvalue and $\lambda_2$ is the secondary eigenvalue. Then, a coherence measure, a strength measure, and an orientation at a pixel corresponding to an image edge can be determined based on the eigenvalues. The coherence measure C of the image edge is given by:

$$C = \frac{\lambda_1 - \lambda_2}{\lambda_1 + \lambda_2} \quad (3)$$

The strength measure S of the edge is given by:

$$S = \lambda_1 \quad (4)$$

The orientation θ of the edge is given by:

$$\theta = 0.5 \arctan\frac{2G_{xy}}{G_{yy}-G_{xx}} \quad (5)$$

Referring to the example kernel dictionary 600 of FIG. 6, it can be seen that for a given pixel type, each kernel 602 is indexed according to a value of coherence, strength, and orientation. Accordingly, the kernel selection process 510 may use the determined measures for a given input Bayer frame 402 to select the appropriate kernel 602 from the kernel dictionary 600.

Referring again to FIG. 5, the first interpolation process 515 and second interpolation process 525 constitute a two-pass demosaic-warp interpolation process for interband enhancement and alias cancelation. The two-pass interpolation outputs an RGB frame based on the input Bayer frame 402, the selected kernel 602, and the alignment vector map 404. These processes will be described in further detail below.

The Bayer to YUV process 555, YUV warp process 540, and deghosting process 545 are a deghosting path, which uses the alignment vector map 404 and a YUV reference frame to generate the output motion map 408. The deghosting path involves a warp using a bilinear kernel (at YUV warp process 540) in the YUV color space.

The Bayer to YUV process 555 converts each input Bayer frame 402 into a half-resolution YUV frame for subsequent deghosting. For example, the conversion can be performed on each Bayer pattern (comprised of a red pixel, a blue pixel, and two green pixels) of the Bayer frame 402 based on the following equations:

$$Y=0.2126*R+0.7152*G+0.0722*B \quad (6)$$

$$U=-0.09991*R-0.33609*G+0.436*B \quad (7)$$

$$V=0.615*R-0.55861*G-0.05639*B \quad (8)$$

where R, B are the red and blue pixel values, respectively, and G is the average of the two green pixels of the Bayer pattern.

The YUV warp process 540 then warps the YUV frame—i.e., interpolates the YUV frame with its alignment vector map as the inverse mapping between input and output coordinates—using the bilinear kernel. The deghosting process 545 next compares the warped YUV frame against a reference (unwarped) YUV frame to generate a motion map 408.

Finally, in the blend/accumulate process 550, the motion map 408 is used to accumulate/blend the RGB frame (output from the two-pass interpolation of processes 515 and 525) with the reference RGB frame to generate the blended RGB frame 406.

Although FIG. 5 illustrates an example adaptive sub-pixel spatiotemporal interpolation process 400, various changes may be made to FIG. 5. For example, various components in FIG. 5 could be combined, further subdivided, or omitted and additional components could be added according to particular needs.

FIGS. 7-11 below further illustrate details of an example fractional-aware kernel dictionary generation process 500. As discussed above, this process generates a dictionary (e.g., dictionary 600) of multiple multi-frame adaptive demosaic-warp kernels with fractional regularization. The demosaic-warp kernels are adaptive according to coherence, strength, orientation, and pixel types and phases. The fractional-aware kernel dictionary generation process 500 begins with generation of prototype kernels. For ease of explanation, the process 500 will be described with respect to the generation of adaptive kernels for one particular combination of coherence C, strength S, and orientation θ measures for one pixel type, but it is understood that the same processes can be applied for each combination of C, S, and θ for each pixel type to generate the full dictionary of adaptive kernels (or set of dictionaries for each pixel type).

Figure 7:
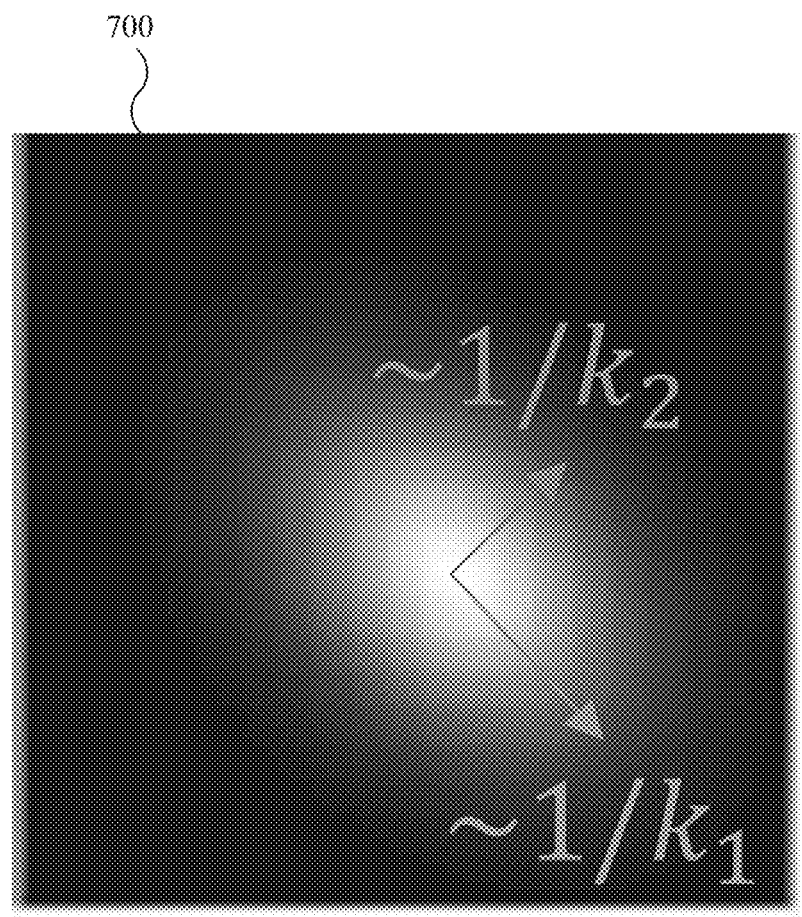
FIG. 7 illustrates an example prototype kernel according to embodiments of this disclosure.

FIG. 7 illustrates an example prototype kernel 700 according to embodiments of this disclosure. In this example, the prototype kernel 700 has a dimension of 80×80. For a given set of coherence C, strength S, and orientation θ measures, a prototype kernel H(x,y) is derived based on the 2D Gaussian function as:

$$H(x, y) = \exp(-0.5[x, y]W[x, y]^T), x, y \in (-3, 2] \quad (9)$$

$$\text{for:} W = eMe^T \quad (10)$$

$$e = \begin{bmatrix} \cos(\theta) & -\sin(\theta) \\ \sin(\theta) & \cos(\theta) \end{bmatrix} \quad (11)$$

$$M = \begin{bmatrix} k'_1(S, C, \theta) & 0 \\ 0 & k'_2(S, C) \end{bmatrix} \quad (12)$$

$$k'_1 = \frac{1}{\left(\max\left(\min(s_1)\lambda, \sqrt{\frac{1}{k_1}}\right)\right)^2} \quad (13)$$

$$k'_2 = \frac{k_2}{k_1} k'_1 \quad (14)$$

where $k_1$, $k_2$ represent the primary axis and secondary axis, respectively, of the prototype kernel 700, and $k_1'$, $k_2'$ represent the fractionally regularized primary axis and secondary axis, respectively, of the prototype kernel 700. As shown in Equation (12), $k_1$, $k_2$ (and $k_1'$, $k_2'$) are functions (or look-up tables) of strength, coherence, and orientation. Equations (13) and (14) relate to the regularization of fractional phases of kernel weight, and are discussed further below.

$k_1$, $k_2$ are proportional to the spectral support (and thus inversely proportional to the spatial support) along the primary and secondary axes, respectively. For instance, a large $k_2$ indicates a large spectral bandwidth (and small spatial weight) along the secondary axis. Generally $k_1 < k_2$, since the primary axis has more spatial support than the secondary axis. For example, the spatial supports $1/k_1$ and $1/k_2$ are illustrated in FIG. 7, and it can be seen that $1/k_2 < 1/k_1$, and thus $k_1 < k_2$. Furthermore, as illustrated in FIG. 7, $1/k_1$ and $1/k_2$ describe the shape of the elliptical Gaussian weight of the prototype kernel 700.

Next, the prototype kernel 700 is divided into multiple polyphase kernels. For example, the prototype kernel having a dimension of 80×80 is subsampled with stride 16 along each dimension to obtain polyphase kernels of dimension 5×5 for 16 weight phases (15 fractional weight phases and 1 integer weight phase). An integer kernel weight has a center of its Gaussian weight (i.e. its weight phase) that coincides with the center of a pixel, while a fractional kernel weight does not. This is shown in FIG. 8.

Figure 8:
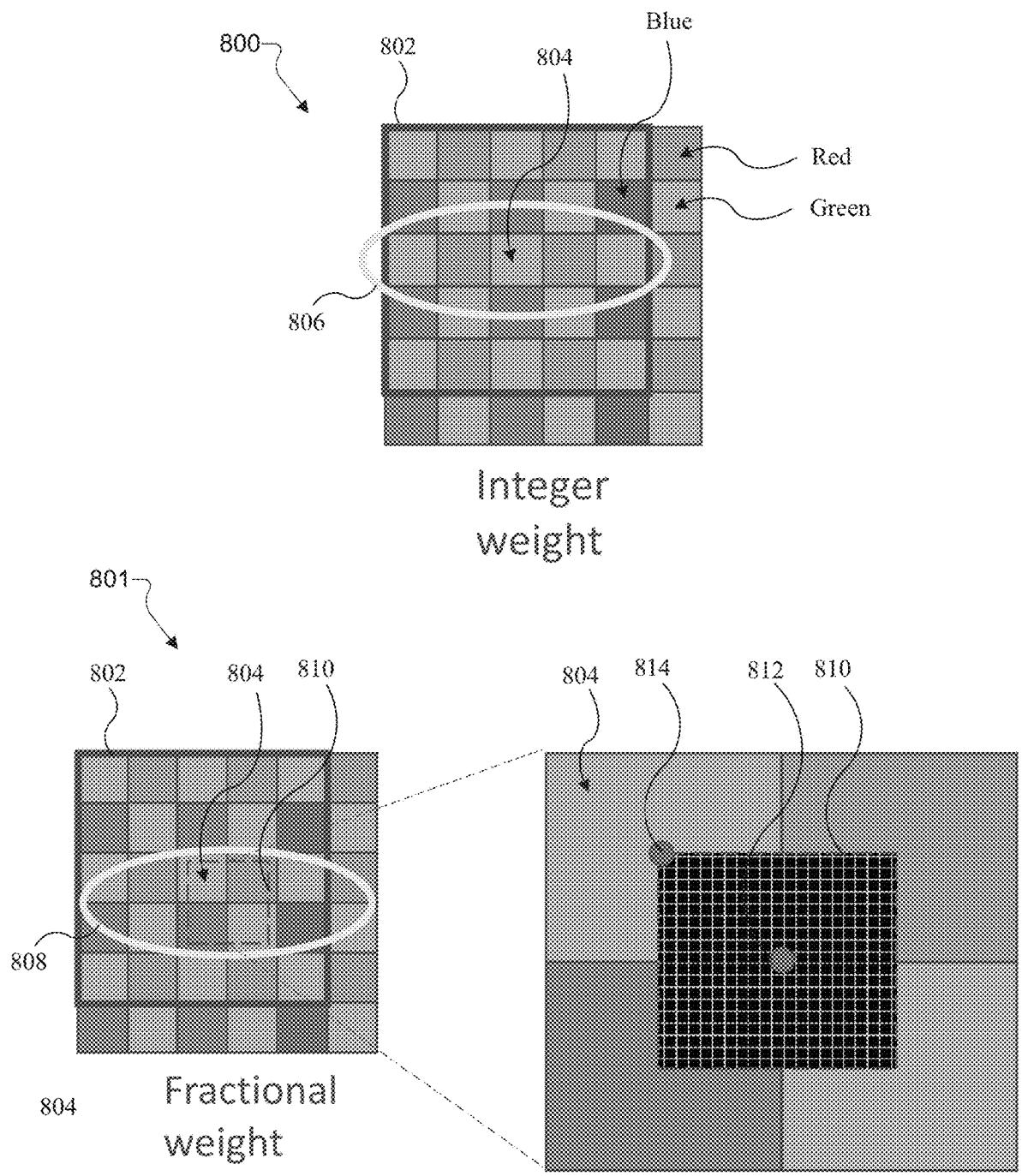
FIG. 8 illustrates an example integer weight phase kernel and an example fractional weight phase kernel of polyphase kernels according to embodiments of this disclosure.

FIG. 8 illustrates an example integer weight phase kernel 800 and an example fractional weight phase kernel 801 of the polyphase kernels according to embodiments of this disclosure. A kernel window 802 is illustrated overlaid on a Bayer pattern. In this example, the polyphase kernels each have dimension 5×5, and accordingly the kernel window 802 is 5×5. The center pixel 804 in the kernel window 802 is the pixel for which the interpolation is performed with the kernel. In this example, the center pixel 804 is green, and accordingly the kernel is used to interpolate red and blue values for this pixel.

The ellipses 806 and 808 denote the weight distributions of the weight phases of the integer weight phase kernel 800 and the fractional weight phase kernel 801, respectively. The center of each ellipse represents the center of the Gaussian weight (i.e., the weight phase) of the polyphase kernel. For the integer weight phase kernel 800, the ellipse 806 is centered on the center pixel 804. For the fractional weight phase kernel 801, the center of the ellipse 808 is located somewhere within the box 810, depending on the fractional value of the weight phase. The box 810 represents a grid of center points of the weight phases of the fractional weight phase kernels. For example, with 1 integer phase and 255 fractional phases (or vertices), the box 810 will be a 16×16 grid inside the kernel window.

A polyphase kernel can have a weight phase value from 0 to 1 along each of the x and y dimensions, and the fractional weight phase kernel having a weight phase value of (0.5, 0.5) is centered at point 812, which is the center of box 810 (and which is the lower right corner of the center pixel 804). The box 810 is thus centered directly in the middle of 4 pixels that make up one Bayer pattern repetition. The integer weight phase is centered at point 814, which is the upper left corner of the box 810.

Although the examples of FIGS. 7 and 8 use a prototype kernel of dimension 80×80 that is divided into 16 polyphase kernels of dimension 5×5 for 16 weight phases, it is understood that other kernel sizes may be used with the embodiments of this disclosure. For example, a prototype kernel of dimension 160×160 that is divided into 32 polyphase kernels of dimension 5×5 (for 32 weight phases) may be used. Other non-limiting examples include a prototype kernel of dimension 112×112 that is divided into 16 polyphase kernels of dimension 7×7 (for 16 weight phases), or a prototype kernel of dimension 224×224 that is divided into 32 polyphase kernels of dimension 7×7 (for 32 weight phases).

The fractional weight phases need regularization, as the polyphase realization creates distortion compared to the original, desired frequency response of the prototype kernel. An example distortion includes unintended bandwidth expansion (and spatial contraction) along the primary axis, resulting in zipper artifacts in outputs interpolated with a fractional weight phase kernel.

Figure 9:
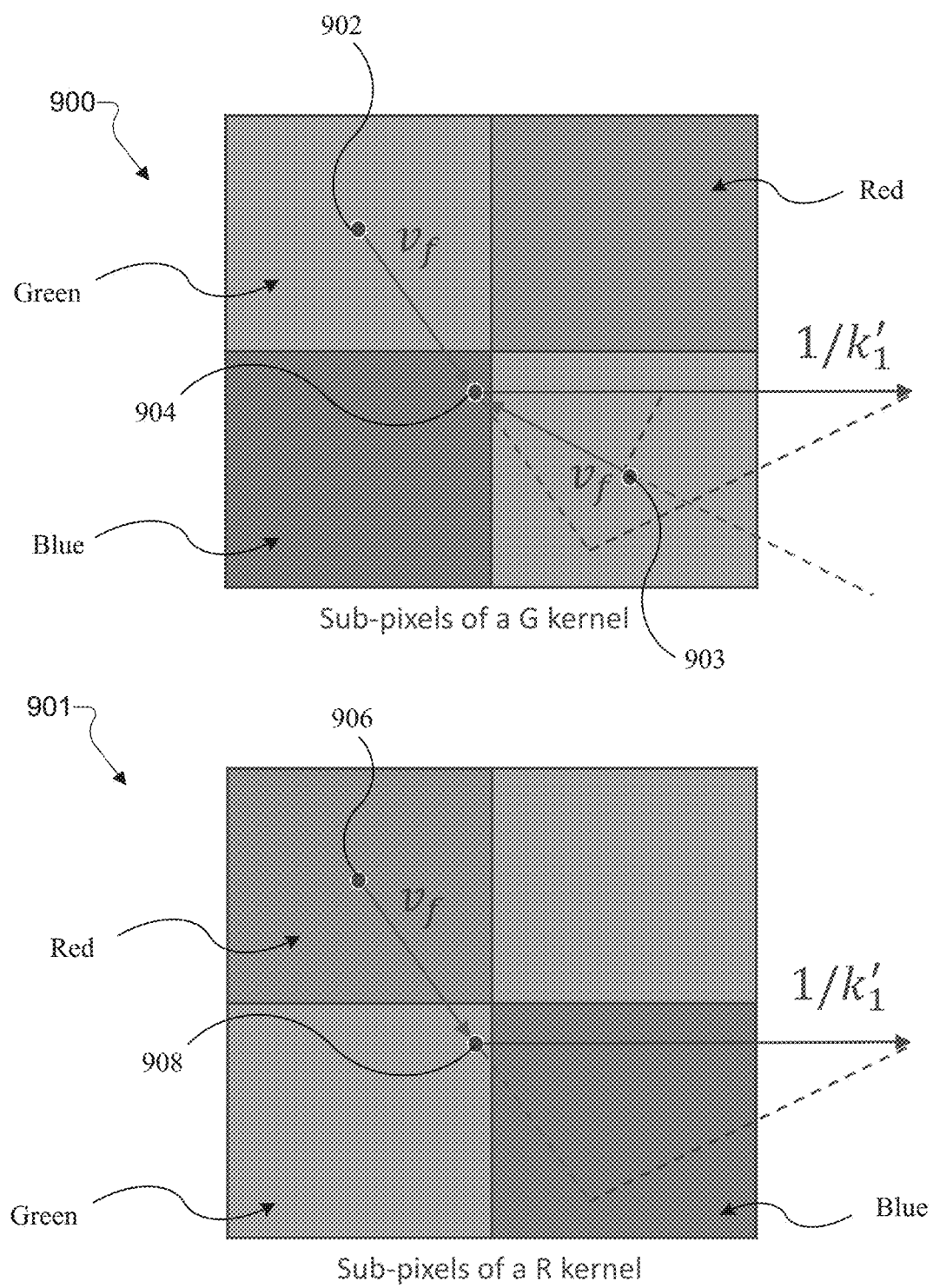
FIG. 9 illustrates examples of fractional regularization according to embodiments of this disclosure.

FIG. 9 illustrates examples of fractional regularization according to embodiments of this disclosure. To facilitate regularization for a given fractional weight phase kernel, a fractional vector of is defined as a vector from an integer weight center to the fractional weight center of the fractional weight phase kernel. In the case of a kernel for green pixels, two fractional vectors are generated (one for each green pixel in the Bayer pattern repetition) from integer weight center points 902 and 903 to the fractional weight center point 904, as illustrated with respect to the sub-pixel 900, which represents sub-pixels for a green kernel. In the case of a kernel for red (or blue) pixels, one fractional vector is generated from integer weight center point 906 to the fractional weight center point 908, as illustrated with respect to the sub-pixel 901, which represents sub-pixels for a red kernel.

For a given kernel primary axis $k_1$, the fractional weight regularization looks for the smallest spatial expansion, denoted $s_1$, needed along the spatial primary axis ($1/k_1$) such that the projection of the expanded spatial primary axis ($1/k_1'$) onto the fractional vector(s) of has the same magnitude as the fractional vector(s). This is described by equations (13) and (14) above:

$$k_1' = \frac{1}{\left(\max\left(\min(s_1)\lambda, \sqrt{\frac{1}{k_1}}\right)\right)^2} \quad (13)$$

$$k_2' = \frac{k_2}{k_1} k_1' \quad (14)$$

$$\text{for:} s_1(v_f) = \frac{\|v_f\|}{\frac{|[\cos(\theta), \sin(\theta)] \cdot v_f|}{\|v_f\|}} \quad (15)$$

where $\lambda$ is a fractional regularization tuning factor. The kernel aspect ratio, i.e., $k_2/k_1$, is kept unchanged during fractional regularization (i.e., $k_2'/k_1'=k_2/k_1$). FIG. 9 illustrates, for both the green and red kernel examples, an expanded spatial primary axis $1/k_1'$ which has a projection with magnitude equal to the magnitude of $v_f$. In the event that the magnitude of $1/k_1$ is already at least as large as the magnitude of $v_f$, then $k_1'=k_1$ can be used.

Figure 10:
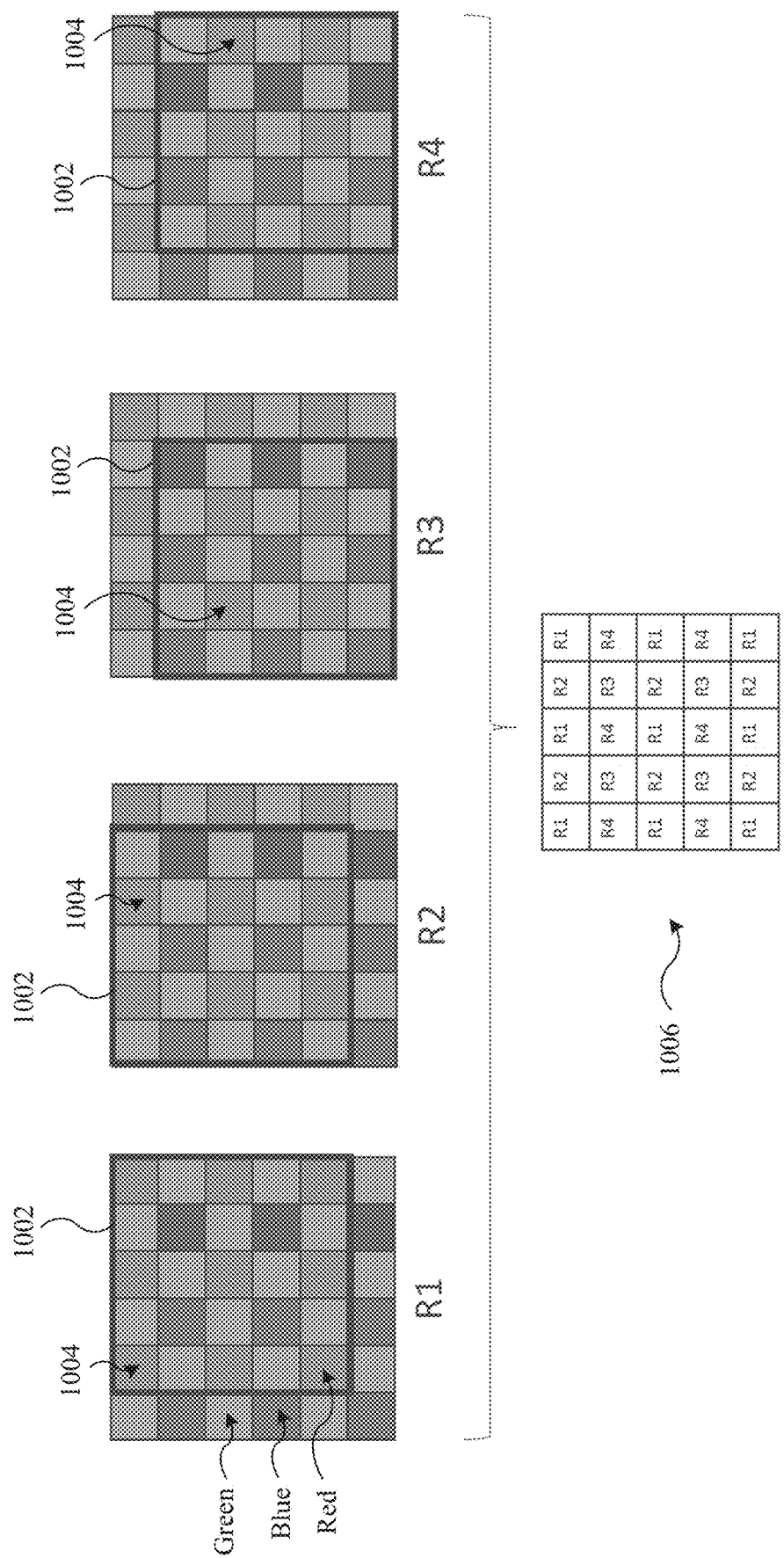
FIGS. 10-11 illustrate examples of normalization of coefficients of fractionally regularized polyphase kernels according to embodiments of this disclosure.

After regularization, the coefficients of each polyphase kernel are normalized. The coefficients can be normalized based on the pixel types and the different phases in which the kernel can overlap the Bayer pattern. For example, as illustrated in FIG. 10, for a 5×5 red (R) kernel denoted as $H_R$, which is a kernel that interpolates pixels at red pixel locations, there are 4 different phases in which the kernel window 1002 can overlap with the input Bayer pattern. For each different phase, the red pixels 1004 of the Bayer pattern are located in different positions within the kernel window 1002, and there is no overlap of red pixel locations between phases. Hence the coefficients of the R kernel can be grouped into 4 disjoint sets (R1, R2, R3, R4) of coefficients that correspond to the positions of the red pixels 1004 of the Bayer pattern within the kernel window 1002 for each of the 4 phases. The coefficients can then be normalized for each disjoint set, and the normalized coefficients of the disjoint sets can be combined to form the normalized kernel coefficient set 1006.

A similar procedure is applied for the 5×5 blue (B) kernel denoted as $H_B$, which is a kernel that interpolates pixels at blue pixel locations, since there are the same number of blue and red pixels in the Bayer pattern, so the B kernel overlaps with the Bayer pattern in 4 phases as well.

Figure 11:
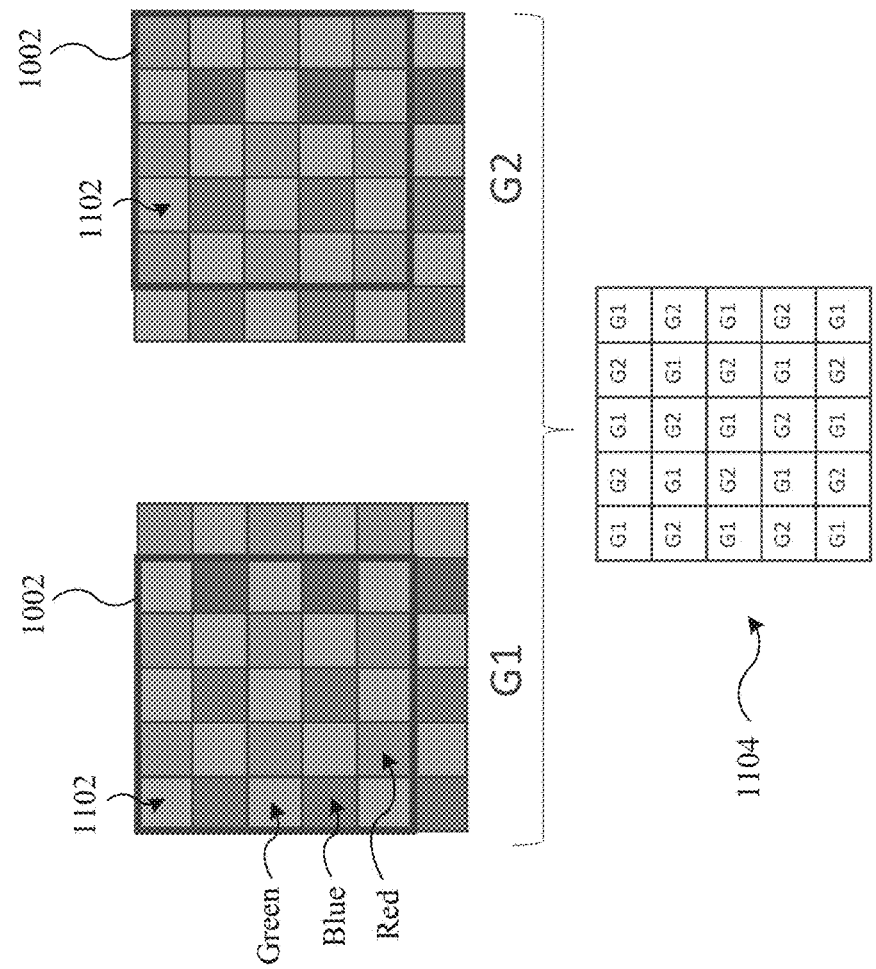

However, as illustrated in FIG. 11, for the 5×5 green (G) kernel denoted as $H_G$, which is a kernel that interpolates pixels at green pixel locations, there are only 2 different phases in which the kernel window 1002 can overlap with the input Bayer pattern. This is because there are double the number of green pixels 1102 as compared to red and blue pixels in the Bayer pattern. Hence the coefficients of the G kernel can be grouped into 2 disjoint sets (G1, G2) of coefficients that correspond to the positions of the green pixels 1102 of the Bayer pattern within the kernel window 1002 for each of the 2 phases. Similar to the R and B kernels, the coefficients can then be normalized for each disjoint set, and the normalized coefficients of the disjoint sets can be combined to form the normalized kernel coefficient set 1104.

Referring again to FIG. 6, after regularization and normalization of each polyphase kernel of the prototype kernel for one particular combination of coherence C, strength S, and orientation θ measures for one pixel type, the resulting kernel is one of the kernels 602 within the kernel dictionary 600, indexed for the particular combination of coherence C, strength S, and orientation θ measures.

Referring again to FIG. 5, further details of the first interpolation process 515 and second interpolation process 525 (i.e., the two-pass demosaic-warp interpolation process for interband enhancement and alias cancelation) are provided below. As discussed above, appropriate adaptive kernels are selected by the kernel selection process 510, based on features of the input Bayer frame 402, for use in the two-pass demosaic-warp interpolation process. These adaptive kernels include an adaptive kernel for green pixels ($H_G$), an adaptive kernel for red pixels ($H_R$), and an adaptive kernel for blue pixels ($H_B$).

The first interpolation process 515 estimates green values at red pixel locations (denoted $G_R$) and green values at blue pixel locations (denoted $G_B$) within the input Bayer frame 402 based on green values at green pixel locations (denoted $G_G$) within the input Bayer frame 402 and the kernel for green pixels. In some embodiments, this is done by convolving the green pixel values at green pixel locations with the kernel for green pixels and then sampling the result at red pixel locations to obtain $G_R$, and sampling the result at blue pixel locations to obtain $G_B$. This can be denoted by:

$$G_R \triangleq \delta_R * (H_G * G_G) \quad (16)$$

$$G_B \triangleq \delta_B * (H_G * G_G) \quad (17)$$

where $H_G$ is the adaptive kernel for green pixels, the * operator denotes convolution, $\delta_R$ denotes the delta function at red pixel locations within the input Bayer frame 402, and $\delta_B$ denotes the delta function at blue pixel locations within the input Bayer frame 402.

The second interpolation process 525 uses the estimated $G_R$ and $G_B$ values generated by the first interpolation process 515, the adaptive kernels, and the alignment vector map to generate a joint demosaic-warped output RGB frame from the input Bayer frame 402. In some embodiments, the green channel (denoted as G) of the output RGB frame is obtained based on the convolution of the green pixel values at green pixel locations with the kernel for green pixels, and shifting the result by a displacement value. This is represented as:

$$G = H_G * G_G(D) \quad (18)$$

where D denotes the displacement, specified by the alignment vector map, between the input (right-hand side) and the output (left-hand side).

The red channel (denoted as R) of the output RGB frame can be determined based on convolving the red pixel values at red pixel locations with the kernel for red pixels, shifting the result by the displacement value, and then performing interband enhancement and alias cancelation (based on the adaptive kernels for red and green pixels, the estimated green values at the red pixel locations and the green values at the green pixel locations). This is represented by the following equation:

$$R = H_R * R_R(D) - H_R * G_R(D) + H_G * G_G(D) \quad (19)$$

where $H_R$ denotes the adaptive kernel for red pixels and $R_R$ denotes the red values at red pixel locations. In equation (19), interband enhancement is achieved by the expression $-H_R*G_R(D)+H_G*G_G(D)$, which represents the added high-pass signal for the R channel. Equation (19) can be rewritten in the form:

$$R = H_R * (R_R - G_R)(D) + G \quad (20)$$

where the expression $R_R - G_R$ represents alias cancelation in the R channel by subtracting the synthesized alias from the downsampled, wideband G channel.

A similar process can be used to determine the blue channel (denoted as B) of the output RGB frame, based on convolving the blue pixel values at blue pixel locations with the kernel for blue pixels, shifting the result by the displacement value, and then performing interband enhancement and alias cancelation (based on the adaptive kernels for blue and green pixels, the estimated green values at the blue pixel locations and the green values at the green pixel locations). This is represented by the following equation:

$$B = H_B * B_B(D) - H_B * G_B(D) + H_G * G_G(D) \qquad (21)$$

where $H_B$ denotes the adaptive kernel for blue pixels and $B_B$ denotes the blue values at blue pixel locations. In equation (21), interband enhancement is achieved by the expression $-H_B * G_B(D) + H_G * G_G(D)$, which represents the added highpass signal for the B channel. Equation (21) can be rewritten in the form:

$$B = H_B * (B_B - G_B)(D) + G \qquad (22)$$

where the expression $B_B - G_B$ represents alias cancelation in the B channel by subtracting the synthesized alias from the downsampled, wideband G channel.

Figure 12:
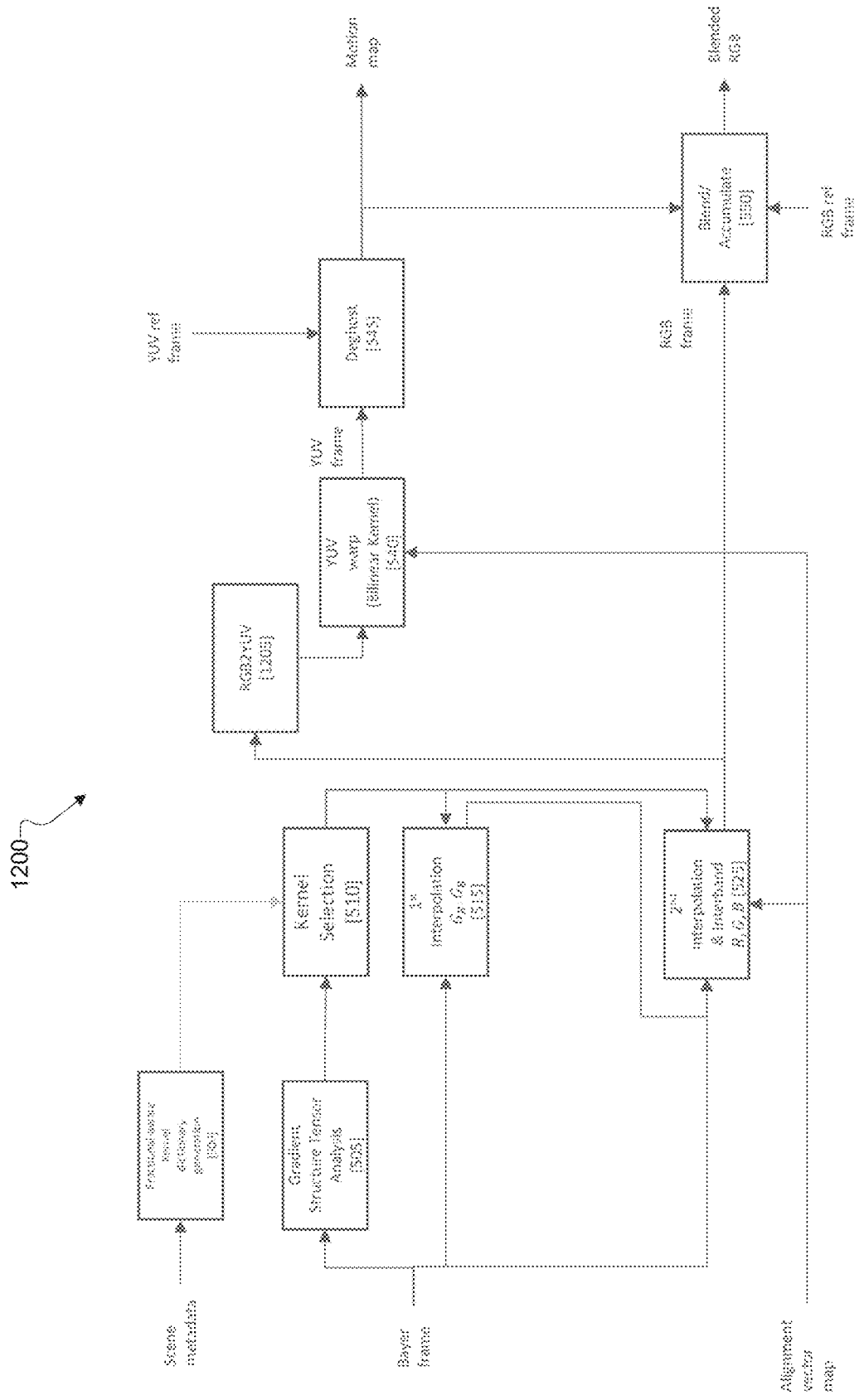
FIG. 12 illustrates an alternative example adaptive sub-pixel spatiotemporal interpolation process according to various embodiments of the present disclosure.

FIG. 12 illustrates an alternative example adaptive sub-pixel spatiotemporal interpolation process 1200 according to various embodiments of the present disclosure. The process of FIG. 12 may be an alternative to the process of FIG. 5, and may be performed by a device such as the electronic device 100, which may be a mobile phone including an integrated camera 165 that acquires Bayer filter images. More specifically, the process of FIG. 12 may be performed by a processor 140 of the electronic device 100, which could include a dedicated image processor. It is understood that any suitable device could perform the process of FIG. 12.

Process 1200 is substantially similar to the process 400 of FIG. 5 with the exception of the RGB to YUV process 1205, which is substituted for the Bayer to YUV process 555 of FIG. 5. The RGB to YUV process 1205 is part of the deghosting path of process 1200, along with YUV warp process 540 and deghosting process 545.

The RGB to YUV process 1205 takes as its input the RGB frame that is output from the two-pass demosaic-warp interpolation process (i.e., the first interpolation process 515 and second interpolation process 525). The RGB to YUV process 1205 then converts the RGB frame into a half-resolution YUV frame for subsequent deghosting. Because the RGB to YUV process 1205 acts on the joint demosaic-warped RGB frame rather than on the input Bayer frame, the quality of the deghosting path output will be higher than that of FIG. 5.

Figure 13:
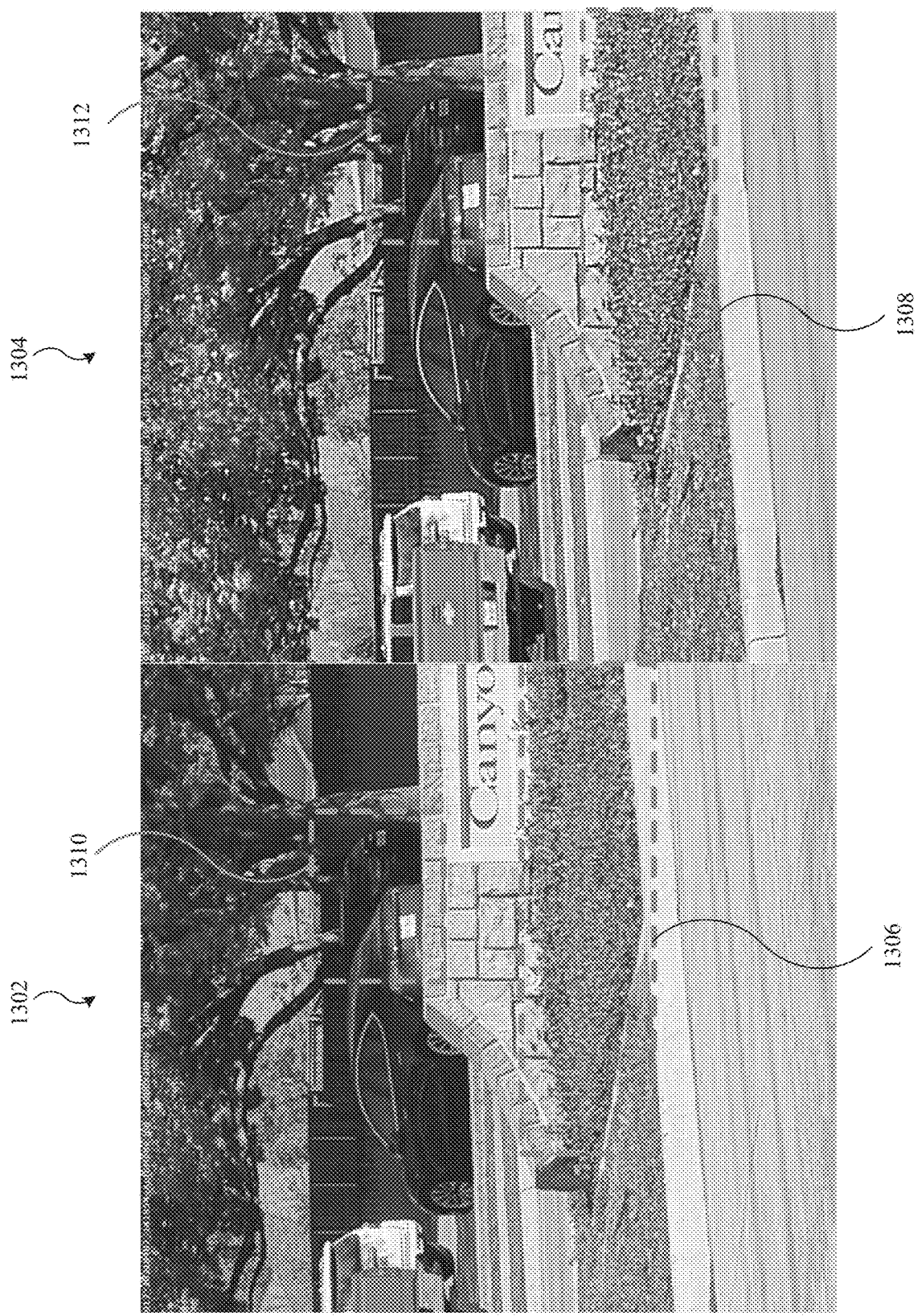
FIGS. 13-15 illustrate examples of the advantages of the adaptive sub-pixel spatiotemporal interpolation process according to various embodiments of the present disclosure.
Figure 14:
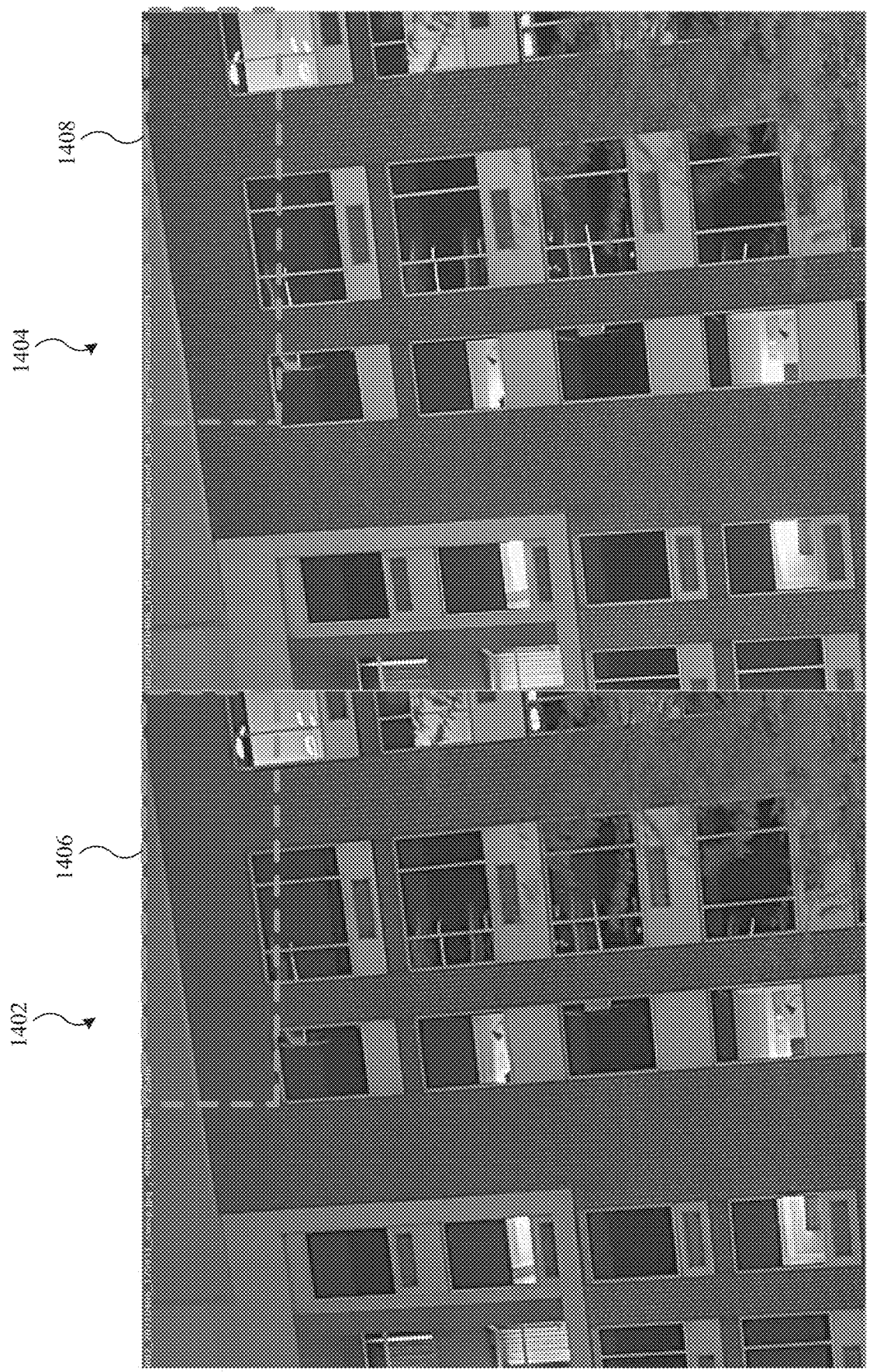
Figure 15:
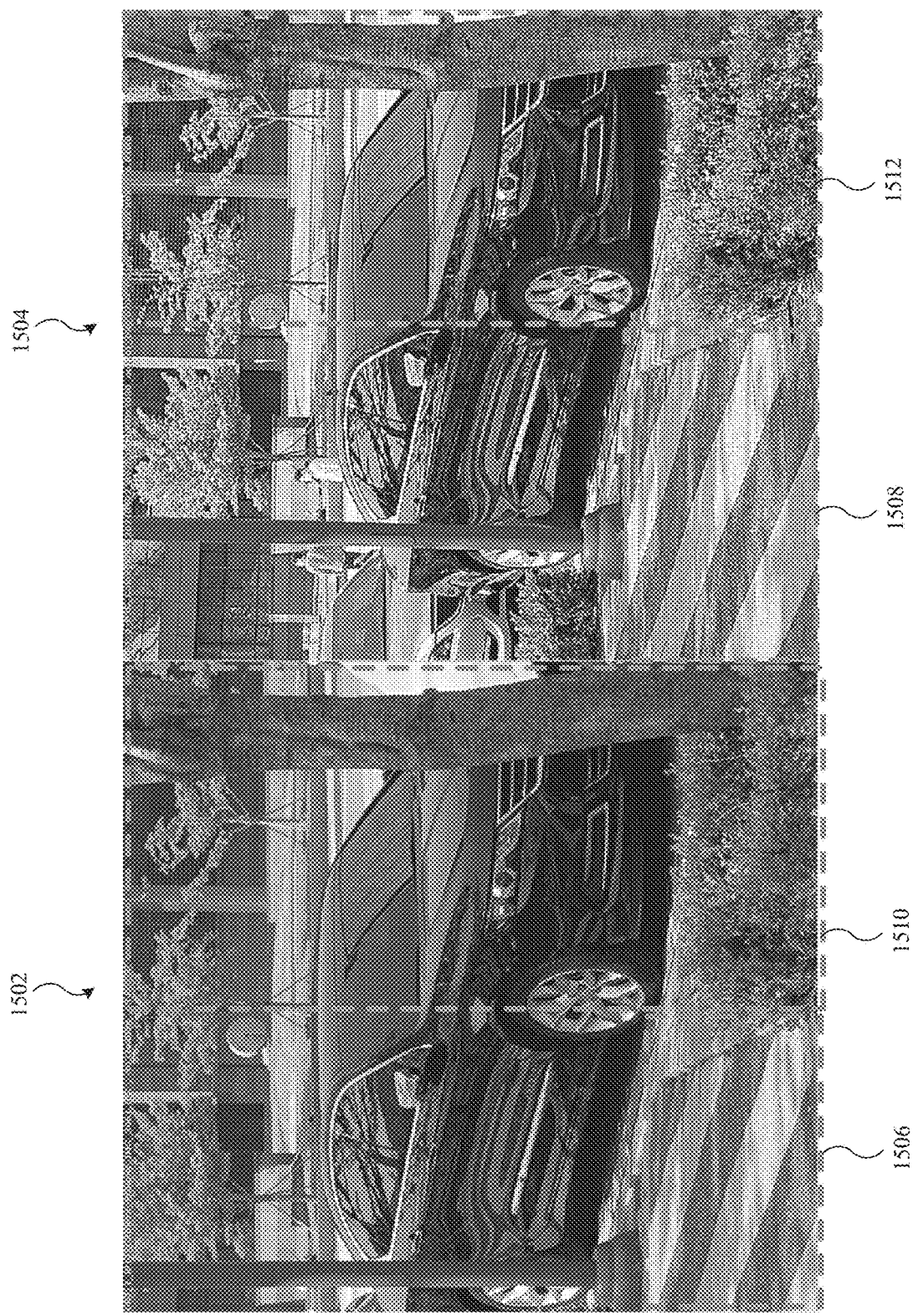

FIGS. 13-15 illustrate examples of the advantages of the adaptive sub-pixel spatiotemporal interpolation process according to various embodiments of the present disclosure. Specifically, FIGS. 13-15 illustrate a comparison between output RGB images 1302, 1402, and 1502 of a subject generated using standard multi-frame image processing pipelines for Bayer filter images and output RGB images 1304, 1404, and 1504 of the same subject generated using a multi-frame image processing pipeline for Bayer filter images that incorporates an adaptive sub-pixel spatiotemporal interpolation process of the present disclosure.

Referring now to FIG. 13, both images 1302 and 1304 are RGB output images of a daytime light Bayer filter image of a parking lot with a median in the foreground, and with shadows cast on cars in the parking lot by a large tree. Comparing image 1302 with image 1304, it can be seen that image 1302 generally has less detail than image 1304. For example, comparing the plants inside box 1306 of image 1302 with those inside box 1308 of image 1304, the texture of the plants can be seen more clearly in image 1304 than in image 1302. Additionally, comparing the car inside box 1310 of image 1302 with that inside box 1312 of image 1304, the edges of the car can be seen more clearly in image 1304 than in image 1302.

Referring now to FIG. 14, both images 1402 and 1404 are RGB output images of a low light Bayer filter image of the side of a building. Comparing the portion of image 1402 inside box 1406 with the portion of image 1404 inside box 1408, it can be seen that there is little or no detail visible in the wall of the building inside box 1406 (in particular, one cannot make out any individual bricks in the wall), while the brick pattern is clearly visible inside box 1408. The adaptive sub-pixel spatiotemporal interpolation process of the present disclosure results in an output RGB image 1404 that has more detail than its counterpart image 1402.

Referring now to FIG. 15, both images 1502 and 1504 are RGB output images of a daytime light Bayer filter image of a parked car with objects in the foreground and background. Comparing the images, it can be seen that image 1502 is generally blurrier and has less detail than image 1504. For example, comparing the pavement inside box 1506 of image 1502 with that inside box 1508 of image 1504, the texture of the pavement can be seen more clearly in image 1504 than in image 1502. Similarly, comparing the shrubs and tree inside box 1510 of image 1502 with those inside box 1512 of image 1504, the texture of the shrubs and tree can be seen more clearly in image 1504 than in image 1502. The adaptive sub-pixel spatiotemporal interpolation process of the present disclosure results in an output RGB image 1504 that has more detail than its counterpart image 1502.

Figure 16A:
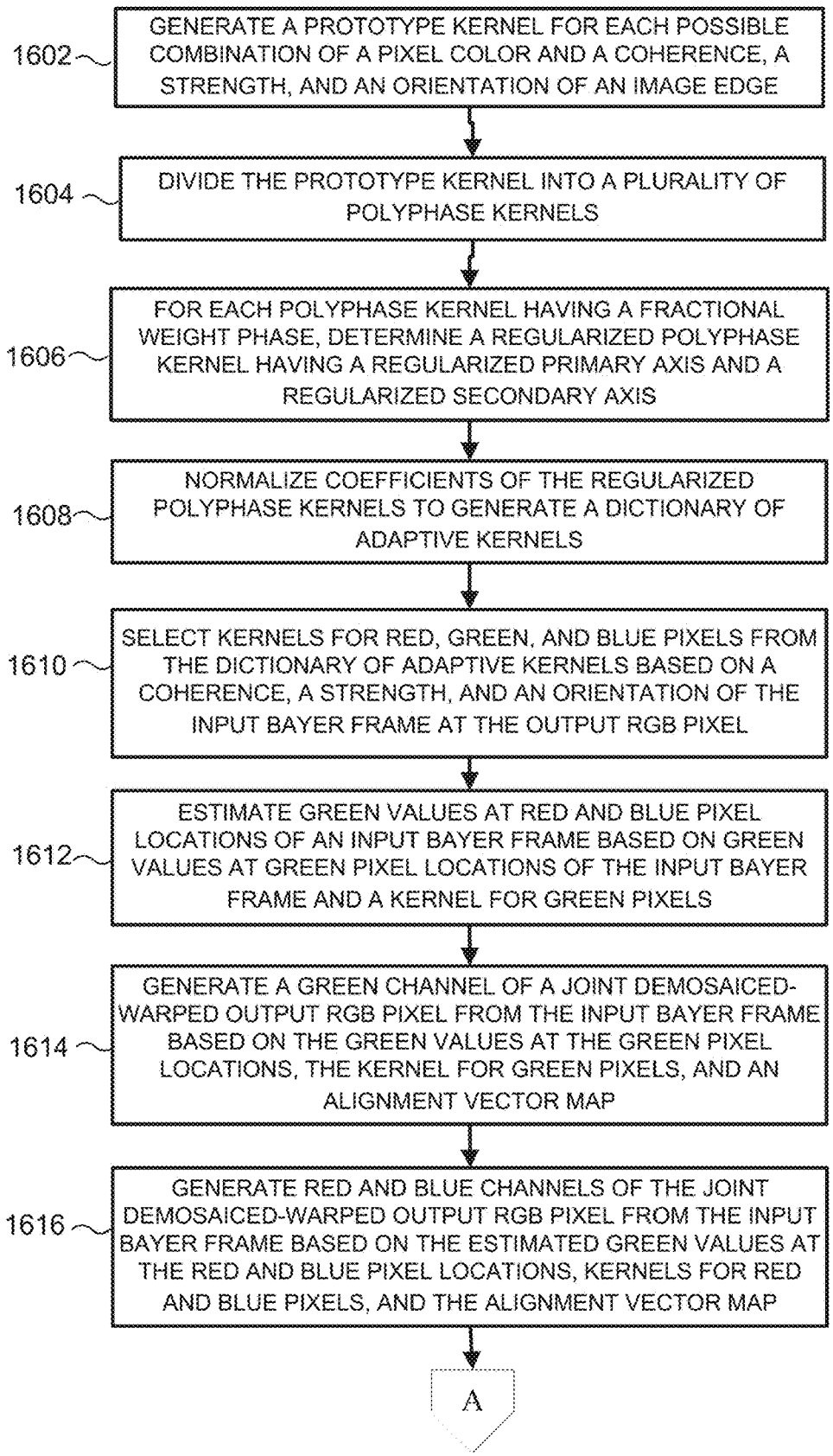
FIGS. 16A-16B illustrate an example method for generating RGB images from Bayer filter images using adaptive sub-pixel spatiotemporal interpolation according to various embodiments of this disclosure.
Figure 16B:
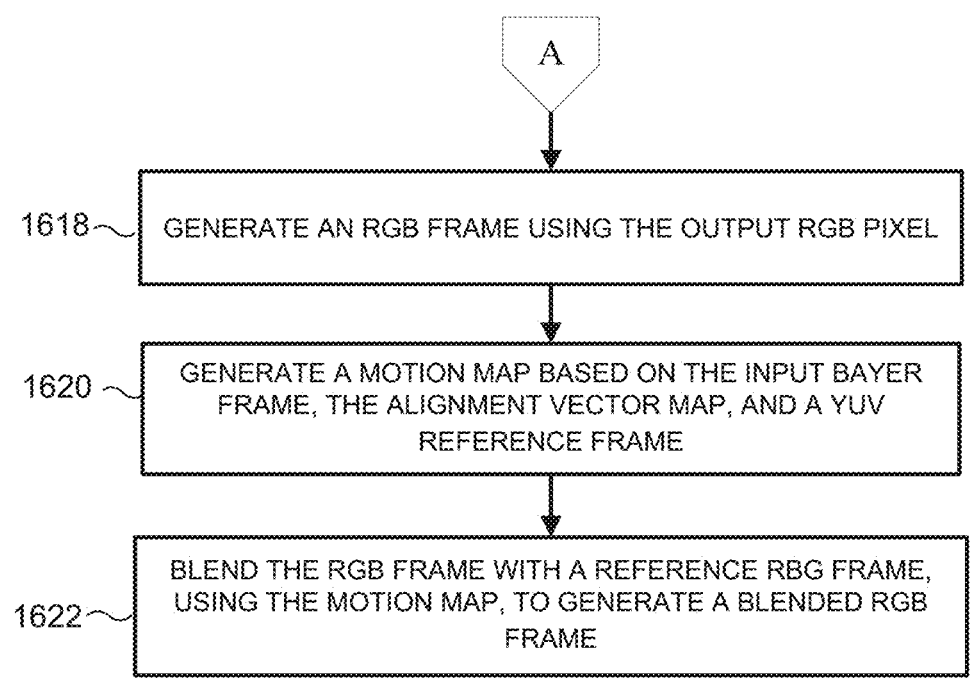

FIGS. 16A-16B illustrate an example method for generating RGB images from Bayer filter images using adaptive sub-pixel spatiotemporal interpolation according to various embodiments of this disclosure. For ease of explanation, the method is described below as being performed by an electronic device 100, but it is understood that any suitable electronic device could perform the method.

Referring now to FIG. 16A, beginning at step 1602, the device generates a prototype kernel for each possible combination of a pixel color and a coherence, a strength, and an orientation of an image edge. The prototype kernel may be, for example, an 80×80 kernel derived based on the 2D Gaussian function, as described above with respect to equations (9)-(14). The prototype kernel has a primary axis and a secondary axis.

At step 1604, the device divides the prototype kernel into a plurality of polyphase kernels. For example, an 80×80 prototype kernel may be divided into 16 5×5 polyphase kernels (for 16 weight phases, including 15 fractional weight phases and 1 integer weight phase). As discussed above, an integer kernel weight has a center of its Gaussian weight (i.e., its weight phase) that coincides with the center of a pixel, while a fractional kernel weight does not.

For each polyphase kernel having a fractional weight phase, the device determines a regularized polyphase kernel having a regularized primary axis and a regularized secondary axis (step 1606). This may include, for example, identifying a fractional vector that is a vector from an integer weight center to a fractional weight center of the polyphase kernel, then determining whether a magnitude of a projection of a primary axis of the polyphase kernel onto the fractional vector is less than a magnitude of the fractional vector. If the magnitude of the projection is less than the magnitude of the fractional vector, then the device may determine the regularized primary axis as an expansion of the primary axis such that a magnitude of the regularized primary axis is equal to the magnitude of the fractional vector. Then the device may determine the regularized secondary axis such that a ratio of the regularized secondary axis to the regularized primary axis is equal to a ratio of the primary axis to a secondary axis of the polyphase kernel.

Next, the device normalizes coefficients of the regularized polyphase kernels to generate a dictionary of adaptive kernels (step 1608). This may include, for example, grouping the coefficients of each regularized polyphase kernel into a number of disjoint sets corresponding to a number of phases in which the regularized polyphase kernel can overlap a Bayer pattern, and normalizing the coefficients for each disjoint set of the regularized polyphase kernel.

Upon completion of step 1608, the device has generated a full fractional-aware kernel dictionary of kernels that are adapted for each different combination of pixel types (i.e., red, green, and blue) and coherence, strength, and orientation measures. At this point, the device can select adaptive kernels for red, green, and blue pixels from the dictionary of adaptive kernels for generation of a joint demosaic-warped output RBG pixel from an input Bayer frame, based on a coherence, a strength, and an orientation of the input Bayer frame at the output RGB pixel (step 1610).

To facilitate the selection of the appropriate adaptive kernels at step 1610, the device may determine a gradient structure tensor of the input Bayer frame, then determine the coherence, the strength, and the orientation of the input Bayer frame at the output RGB pixel based on a dominant eigenvalue and a secondary eigenvalue of the gradient structure tensor. The device can then select the adaptive kernels from the dictionary of adaptive kernels based on the determined coherence, strength, and orientation.

After the appropriate adaptive kernels have been selected, the device performs the two-pass demosaic-warp interpolation process for interband enhancement and alias cancelation. First, at step 1612, the device estimates green values at red and blue pixel locations of the input Bayer frame based on green values at green pixel locations of the input Bayer frame and a kernel for green pixels (as selected in step 1610). The estimation of step 1610 can include convolving the green values at the green pixel locations with the kernel for green pixels, then sampling a result of the convolution at the red pixel locations to estimate the green values at the red pixel locations, and sampling the result of the convolution at the blue pixel locations to estimate the green values at the blue pixel locations.

At step 1614, the device generates a green channel of a joint demosaiced-warped output RGB pixel from the input Bayer frame based on the green values at the green pixel locations, the kernel for green pixels, and an alignment vector map. Generating the green channel may be done by convolving the kernel for green pixels with the green values at the green pixel locations, then shifting by a displacement value specified by the alignment vector map.

At step 1616, the device generates red and blue channels of the joint demosaiced-warped output RGB pixel from the input Bayer frame based on the estimated green values at the red and blue pixel locations, kernels for red and blue pixels (as selected in step 1610, and the alignment vector map.

Generating the red channel may include convolving the kernel for red pixels with red values at the red pixel locations, then shifting by a displacement value specified by the alignment vector map to generate a first convolution result, and convolving the kernel for red pixels with the estimated green values at the red pixel locations, then shifting by the displacement value to generate a second convolution result. The red channel can then be generated by subtracting the second convolution result from the first convolution result and adding the green channel.

Generating the blue channel may include convolving the kernel for blue pixels with blue values at the blue pixel locations, then shifting by the displacement value to generate a third convolution result, and convolving the kernel for blue pixels with the estimated green values at the blue pixel locations, then shifting by the displacement value to generate a fourth convolution result. The blue channel can then be generated by subtracting the fourth convolution result from the third convolution result and adding the green channel.

At this point, the green, red, and blue channels have been generated for the RGB pixel. Referring now to FIG. 16B, the device next generates an RGB frame using the output RGB pixel (step 1618). For example, the device may generate each RGB pixel of the output RGB frame according to the same method.

The device then generates a motion map based on the input Bayer frame, the alignment vector map, and a YUV reference frame (step 1620). Finally, the device blends the RGB frame with a reference RBG frame, using the motion map, to generate a blended RGB frame (step 1622). The device may then repeat the method to generate additional RGB frames from additional input Bayer frames.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
a processor configured to:
estimate green values at red and blue pixel locations of an input Bayer frame based on green values at green pixel locations of the input Bayer frame and a kernel for green pixels;
generate a green channel of a joint demosaiced-warped output RGB pixel from the input Bayer frame based on the green values at the green pixel locations, the kernel for green pixels, and an alignment vector map; and
generate red and blue channels of the joint demosaiced-warped output RGB pixel from the input Bayer frame based on the estimated green values at the red and blue pixel locations, kernels for red and blue pixels, and the alignment vector map.

2. The electronic device of claim 1, wherein the processor is further configured to:
convolve the green values at the green pixel locations with the kernel for green pixels;
sample a result of the convolution at the red pixel locations to estimate the green values at the red pixel locations; and
sample the result of the convolution at the blue pixel locations to estimate the green values at the blue pixel locations.

3. The electronic device of claim 1, wherein the processor is further configured to:
to generate the green channel, convolve the kernel for green pixels with the green values at the green pixel locations, then shift by a displacement value specified by the alignment vector map.

4. The electronic device of claim 1, wherein the processor is further configured to:
convolve the kernel for red pixels with red values at the red pixel locations, then shift by a displacement value specified by the alignment vector map to generate a first convolution result, and convolve the kernel for red pixels with the estimated green values at the red pixel locations, then shift by the displacement value to generate a second convolution result;
to generate the red channel, subtract the second convolution result from the first convolution result and add the green channel;
convolve the kernel for blue pixels with blue values at the blue pixel locations, then shift by the displacement value to generate a third convolution result, and convolve the kernel for blue pixels with the estimated green values at the blue pixel locations, then shift by the displacement value to generate a fourth convolution result; and
to generate the blue channel, subtract the fourth convolution result from the third convolution result and add the green channel.

5. The electronic device of claim 1, wherein the processor is further configured to:
generate a prototype kernel for each possible combination of a pixel color and a coherence, a strength, and an orientation of an image edge;
divide the prototype kernel into a plurality of polyphase kernels;
for each polyphase kernel having a fractional weight phase, determine a regularized polyphase kernel having a regularized primary axis and a regularized secondary axis;
normalize coefficients of the regularized polyphase kernels to generate a dictionary of adaptive kernels; and
select the kernels for red, green, and blue pixels from the dictionary of adaptive kernels based on a coherence, a strength, and an orientation of the input Bayer frame at the output RGB pixel.

6. The electronic device of claim 5, wherein the processor is further configured to:
in order to determine the regularized polyphase kernel for each polyphase kernel having a fractional weight phase:
identify a fractional vector that is a vector from an integer weight center to a fractional weight center of the polyphase kernel,
determine whether a magnitude of a projection of a primary axis of the polyphase kernel onto the fractional vector is less than a magnitude of the fractional vector,
determine, based on the magnitude of the projection being less than the magnitude of the fractional vector, the regularized primary axis as an expansion of the primary axis such that a magnitude of the regularized primary axis is equal to the magnitude of the fractional vector, and
determine the regularized secondary axis such that a ratio of the regularized secondary axis to the regularized primary axis is equal to a ratio of the primary axis to a secondary axis of the polyphase kernel; and in order to normalize the coefficients of the regularized polyphase kernels:
group the coefficients of each regularized polyphase kernel into a number of disjoint sets corresponding to a number of phases in which the regularized polyphase kernel can overlap a Bayer pattern, and
normalize the coefficients for each disjoint set of the regularized polyphase kernel to obtain the normalized coefficients for the regularized polyphase kernel.

7. The electronic device of claim 1, wherein the processor is further configured to:
generate an RGB frame using the output RGB pixel;
generate a motion map based on the input Bayer frame, the alignment vector map, and a YUV reference frame; and
blend the RGB frame with a reference RBG frame, using the motion map, to generate a blended RGB frame.

8. An electronic device comprising:
a processor configured to:
generate a prototype kernel for each possible combination of a pixel color and a coherence, a strength, and an orientation of an image edge;
divide the prototype kernel into a plurality of polyphase kernels;
for each polyphase kernel having a fractional weight phase, determine a regularized polyphase kernel having a regularized primary axis and a regularized secondary axis;
normalize coefficients of the regularized polyphase kernels to generate a dictionary of adaptive kernels; and
select adaptive kernels for red, green, and blue pixels from the dictionary of adaptive kernels for generation of a joint demosaic-warped output RBG pixel from an input Bayer frame, based on a coherence, a strength, and an orientation of the input Bayer frame at the output RGB pixel.

9. The electronic device of claim 8, wherein the processor is further configured to, in order to determine the regularized polyphase kernel for each polyphase kernel having a fractional weight phase:
identify a fractional vector that is a vector from an integer weight center to a fractional weight center of the polyphase kernel;
determine whether a magnitude of a projection of a primary axis of the polyphase kernel onto the fractional vector is less than a magnitude of the fractional vector;
determine, based on the magnitude of the projection being less than the magnitude of the fractional vector, the regularized primary axis as an expansion of the primary axis such that a magnitude of the regularized primary axis is equal to the magnitude of the fractional vector; and
determine the regularized secondary axis such that a ratio of the regularized secondary axis to the regularized primary axis is equal to a ratio of the primary axis to a secondary axis of the polyphase kernel.

10. The electronic device of claim 8, wherein the processor is further configured to, in order to normalize the coefficients of the regularized polyphase kernels:
group the coefficients of each regularized polyphase kernel into a number of disjoint sets corresponding to a number of phases in which the regularized polyphase kernel can overlap a Bayer pattern; and normalize the coefficients for each disjoint set of the regularized polyphase kernel to obtain the normalized coefficients for the regularized polyphase kernel.

11. The electronic device of claim 8, wherein the processor is further configured to:
determine a gradient structure tensor of the input Bayer frame;
determine the coherence, the strength, and the orientation of the input Bayer frame at the output RGB pixel based on a dominant eigenvalue and a secondary eigenvalue of the gradient structure tensor; and
select the adaptive kernels from the dictionary of adaptive kernels based on the determined coherence, strength, and orientation.

12. The electronic device of claim 8, wherein the processor is further configured to:
estimate green values at red and blue pixel locations within a window of the input Bayer frame based on green values at green pixel locations within the window and the adaptive kernel for green pixels;
generate a green channel of the output RGB pixel from the input Bayer frame based on the green values at the green pixel locations, the adaptive kernel for green pixels, and an alignment vector map; and
generate red and blue channels of the output RGB pixel from the input Bayer frame based on the estimated green values at the red and blue pixel locations, the adaptive kernels for red and blue pixels, and the alignment vector map.

13. The electronic device of claim 12, wherein the processor is further configured to:
convolve the green values at the green pixel locations with the adaptive kernel for green pixels;
sample a result of the convolution at the red pixel locations to estimate the green values at the red pixel locations; and
sample the result of the convolution at the blue pixel locations to estimate the green values at the blue pixel locations.

14. The electronic device of claim 12, wherein the processor is further configured to:
to generate the green channel, convolve the adaptive kernel for green pixels with the green values at the green pixel locations, then shift by a displacement value specified by the alignment vector map;
convolve the adaptive kernel for red pixels with red values at the red pixel locations, then shift by the displacement value to generate a first convolution result, and convolve the adaptive kernel for red pixels with the estimated green values at the red pixel locations, then shift by the displacement value to generate a second convolution result;
to generate the red channel, subtract the second convolution result from the first convolution result and add the green channel;
convolve the adaptive kernel for blue pixels with blue values at the blue pixel locations, then shift by the displacement value to generate a third convolution result, and convolve the adaptive kernel for blue pixels with the estimated green values at the blue pixel locations, then shift by the displacement value to generate a fourth convolution result; and
to generate the blue channel, subtract the fourth convolution result from the third convolution result and add the green channel.

15. A method for generating RGB images from Bayer filter images comprising:
estimating green values at red and blue pixel locations of an input Bayer frame based on green values at green pixel locations of the input Bayer frame and a kernel for green pixels;
generating a green channel of a joint demosaiced-warped output RGB pixel from the input Bayer frame based on the green values at the green pixel locations, the kernel for green pixels, and an alignment vector map; and
generating red and blue channels of the joint demosaiced-warped output RGB pixel from the input Bayer frame based on the estimated green values at the red and blue pixel locations, kernels for red and blue pixels, and the alignment vector map.

16. The method of claim 15, further comprising:
convolving the green values at the green pixel locations with the kernel for green pixels;
sampling a result of the convolution at the red pixel locations to estimate the green values at the red pixel locations; and
sampling the result of the convolution at the blue pixel locations to estimate the green values at the blue pixel locations.

17. The method of claim 15, further comprising:
generating the green channel by convolving the kernel for green pixels with the green values at the green pixel locations, then shifting by a displacement value specified by the alignment vector map;
convolving the kernel for red pixels with red values at the red pixel locations, then shifting by a displacement value specified by the alignment vector map to generate a first convolution result, and convolving the kernel for red pixels with the estimated green values at the red pixel locations, then shifting by the displacement value to generate a second convolution result;
generating the red channel by subtracting the second convolution result from the first convolution result and adding the green channel;
convolving the kernel for blue pixels with blue values at the blue pixel locations, then shifting by the displacement value to generate a third convolution result, and convolving the kernel for blue pixels with the estimated green values at the blue pixel locations, then shifting by the displacement value to generate a fourth convolution result; and
generating the blue channel by subtracting the fourth convolution result from the third convolution result and adding the green channel.

18. The method of claim 15, further comprising:
generating a prototype kernel for each possible combination of a pixel color and a coherence, a strength, and an orientation of an image edge;
dividing the prototype kernel into a plurality of polyphase kernels;
for each polyphase kernel having a fractional weight phase, determining a regularized polyphase kernel having a regularized primary axis and a regularized secondary axis;
normalizing coefficients of the regularized polyphase kernels to generate a dictionary of adaptive kernels; and
selecting the kernels for red, green, and blue pixels from the dictionary of adaptive kernels based on a coherence, a strength, and an orientation of the input Bayer frame at the output RGB pixel.

19. The method of claim 18, further comprising:
determining the regularized polyphase kernel for each polyphase kernel having a fractional weight phase by:

identifying a fractional vector that is a vector from an integer weight center to a fractional weight center of the polyphase kernel, determining whether a magnitude of a projection of a primary axis of the polyphase kernel onto the fractional vector is less than a magnitude of the fractional vector, determining, based on the magnitude of the projection being less than the magnitude of the fractional vector, the regularized primary axis as an expansion of the primary axis such that a magnitude of the regularized primary axis is equal to the magnitude of the fractional vector, and determining the regularized secondary axis such that a ratio of the regularized secondary axis to the regularized primary axis is equal to a ratio of the primary axis to a secondary axis of the polyphase kernel; and normalizing the coefficients of the regularized polyphase kernels by:

grouping the coefficients of each regularized polyphase kernel into a number of disjoint sets corresponding to a number of phases in which the regularized polyphase kernel can overlap a Bayer pattern, and normalizing the coefficients for each disjoint set of the regularized polyphase kernel to obtain the normalized coefficients for the regularized polyphase kernel.

20. The method of claim 15, further comprising:

generating an RGB frame using the output RGB pixel;

generating a motion map based on the input Bayer frame, the alignment vector map, and a YUV reference frame; and blending the RGB frame with a reference RBG frame, using the motion map, to generate a blended RGB frame.

* * * * *